United States Patent [19]

Yamanashi

[11] Patent Number: 5,170,292
[45] Date of Patent: Dec. 8, 1992

[54] WIDE-ANGLE ZOOM LENS SYSTEM

[75] Inventor: Takanori Yamanashi, Tokyo, Japan

[73] Assignee: Olympus Optical Co., Ltd., Tokyo, Japan

[21] Appl. No.: 638,829

[22] Filed: Jan. 8, 1991

[30] Foreign Application Priority Data

Jan. 10, 1990 [JP] Japan ..................... 2-1521

[51] Int. Cl.$^5$ ............................................. G02B 15/00
[52] U.S. Cl. ..................................... 359/686; 359/708
[58] Field of Search ............ 350/423, 427, 432; 359/676, 683, 708, 686, 687

[56] References Cited

U.S. PATENT DOCUMENTS

| | | | |
|---|---|---|---|
| 4,666,257 | 5/1987 | Tanaka et al. | 359/654 |
| 4,749,267 | 6/1988 | Mihara | 359/652 |
| 4,822,152 | 4/1989 | Yamanashi | 350/427 |
| 4,953,957 | 9/1990 | Kobayashi | 359/688 |
| 4,976,521 | 12/1990 | Ishii et al. | 359/686 |

Primary Examiner—Frank Gonzalez
Attorney, Agent, or Firm—Cushman, Darby & Cushman

[57] ABSTRACT

A zoom lens system comprising, in the order from the object side, a first lens unit having a positive refractive power, a second lens unit having a weak refractive power (i.e., less than 0.01), a third lens unit having a positive refractive power and a fourth lens unit having a negative refractive power, and adapted so as to perform variation of focal length thereof by varying airspaces reserved between the lens units. This zoom lens system has a broad vari-focal range covering a super wide field angle.

6 Claims, 16 Drawing Sheets

WIDE-ANGLE ZOOM LENS SYSTEM

BACKGROUND OF THE INVENTION a) Field of the Invention

The present invention relates to a compact zoom lens system which has a high vari-focal ratio and a zooming range covering a super wide angle.

b) Description of the Prior Art

In the recent years, there are increasingly used fully automated cameras which have multiple functions in portable mechanical structures and are equipped with zoom lens systems. Further, these zoom lens systems for cameras are generally designed so as to widen photographic ranges.

It is desirable for shortening the total length of the zoom lens system of this type to select the refractive power distribution of the telephoto type lens system which enables to locate the lens system close to the image surface and design the lens system compact. However, the conventional zoom lens systems are mostly designed so as to have a sufficiently broad zooming range on the side of the tele positions as exemplified by the zoom lens system disclosed by U.S. Pat. No. 4,822,152 which has a high vari-focal ratio but is designed for a field angle on the order of 63° at widest at the wide position. When an attempt is made to widen a field angle at the wide position of a zoom lens system which is of the telephoto type in the refractive power distribution thereof, back focal length of the zoom lens system is extremely shortened at the wide position, thereby enlarging diameter of the lens system and aggravating flare due to reflections on lens surfaces. Further, distortion and sagittal coma are aggravated by widening the field angle and can hardly be corrected.

For these reasons, there has been developed no compact zoom lens systems for cameras which has a field angle at the wide position as wide as that of the super wide-angle lens system for single-lens reflex cameras.

SUMMARY OF THE INVENTION

A primary object of the present invention is to provide a compact zoom lens system which has a zooming range covering a super wide-angle region.

Another object of the present invention is to provide a zoom lens system which has aberrations favorably corrected even in the super wide field angle region.

These objects can be accomplished by adequate selections of a type of zoom lens system, a paraxial refractive power distribution and an arrangement of thick lens elements as well as adequate use of aspherical surfaces.

At the stage to select the type of the zoom lens system, the inventor adopts, for flexibility of correction of aberrations in details, a composition consisting of four lens units, and determines a refractive power distribution so as to arrange, in the order from the object side, a first lens unit having a positive refractive power, a second lens unit having a positive or negative refractive power, a third lens unit having a positive refractive power and a fourth lens unit having a negative refractive power. The zoom lens system was designed so as to vary focal length thereof by varying the airspaces reserved between the lens units. FIG. 25 illustrates the loci selected for moving the lens units.

In the zoom lens system according to the present invention, a vari-focal function is imparted to the fourth lens unit, a function to correct deviation of image point is imparted to the third lens unit, and flatness of image surface is maintained by delicately controlling the airspace reserved between the second lens unit and the third lens unit. Further, the first lens unit which serves as a leading cam in the zoom lens system as a whole has no function directly related to variation of focal length, but has a role to determine the object point for the second lens unit.

In order to accomplish the objects of the present invention, the refractive power distribution selected for the zoom lens system according to the present invention has a characteristic such that the second lens unit has a weak refractive power. From the viewpoint of the design of the zoom lens system, the second lens unit does not function independently but serves as a composite system also comprising the second lens unit.

FIG. 26 shows refractive power distribution in the composite system consisting of the first lens unit and the second lens unit which are assumed to be composed of thin lens elements. Refractive power $\phi_{12}$ of the composite system shown in FIG. 26 is given by the following formula:

$$\phi_{12} = \phi_1 + \phi_2 - e_1' \cdot \phi_1 \cdot \phi_2$$

wherein the reference symbols $\phi_1$ and $\phi_2$ represent the refractive powers of the first lens unit and the second lens unit respectively, and the reference symbol $e_1'$ designates the distance between the principal points of the first lens unit and the second lens unit.

In the zoom lens system according to the present invention, the second lens unit has a weak refractive power as described above and satisfies the following condition (1):

$$|\phi_2| < 0.01 \tag{1}$$

If the condition (1) is not satisfied, the zooming range, including the super wide field angle, will be incompatible with favorable correction of aberrations.

In order to weaken $\phi_2$ with constant values given to $\phi_1$ and $\phi_{12}$ respectively, it is necessary to prolong $e_1'$. When $e_1'$ is prolonged simply, however, the airspace reserved between the first lens unit and the second lens unit will be widened, whereby the zoom lens system, considered as a paraxial lens system, will undesirably have a long total length.

The present invention selects a composition which allows the zoom lens system to have a super wide field angle as the object of the present invention, favorable optical performance and principal points at locations suited for obtaining a broad zooming range. This composition facilitates correction of aberrations.

Further, in a composition of the zoom lens system wherein the distance between the principal points of each pair of the lens units is prolonged, arrangement of thick lens elements in each of the lens units is determined taking the locations of the principal points of the lens unit into consideration. This arrangement of the thick lens elements is determined for the first lens unit through the third lens unit, and the fourth lens unit is designed as an independent negative lens unit.

For correcting aberrations in a lens system having a wide field angle, it is desirable that the first lens unit has a positive refractive power as a whole, and is composed of a negative lens component and a positive lens component. Paraxial refractive power distribution in the first lens unit having the composition described above is as illustrated in FIG. 27. In this refractive power distribution, the distance between the principal points of these two lens components, considered as thin lens components, is expressed by the following formula:

$$e_I' = \{(1+\beta_p)f_p\}/\beta_p - f_n$$

wherein the reference symbols $f_p$ and $f_n$ represent the focal lengths of the positive lens component and the negative lens component respectively, and the reference symbol $\beta_p$ designates the paraxial magnification of the positive lens component.

Further, it is desirable to impose a limit on the focal length $f_1$ as defined by the following condition (2):

$$f_1 < |f_{12}| \qquad (2)$$

$$f_1 = f_n \cdot \beta_p$$

wherein $1/f_{12} = (1/f_1) + (1/f_2) - e_1'' \cdot 1/f_1$, $f_2$ and the reference symbol $f_{12}$ represents the total focal length of the first lens unit and the second lens unit.

If the condition (2) is not satisfied, it will be difficult to obtain the zoom lens system having the super wide field angle or accomplish the object of the present invention. That is to say, if the condition (2) is not satisfied, refractive power distribution for the first lens unit and the second lens unit will be different from the target, thereby making it difficult to select the composition which is suited for obtaining the desired optical performance.

Since the present invention has the object to obtain a field angle of at least 72° or so at the wide position, the first lens unit of the zoom lens system according to the present invention has the composition described below for correction of aberrations. Speaking concretely, the first lens unit has a fundamental composition, for obtaining the wide field angle, wherein a negative meniscus lens component having a convex surface on the object side or a biconcave lens component, an airspace $D_A$ and a positive lens component are arranged in the order from the object side. The first lens unit comprises the air lens formed between the negative lens unit and the positive lens unit as described above, and is designed so as to satisfy the following condition (3):

$$\theta_{1w}/\theta_{2w} > 1 \qquad (3)$$

wherein the reference symbol $\theta_{1w}$ represents the angle formed between the principal ray incident on the first lens unit and the optical axis at the wide position, and the reference symbol $\theta_{2w}$ designates the angle formed between the principal ray emerging from the negative lens component arranged in the first lens unit and the optical axis, these angles being illustrated, for example, in FIG. 3 and FIG. 4.

As is understood from the foregoing description, the first lens unit of the zoom lens system according to the present invention has the composition which is similar to that of the diverging lens unit used in a retrofocus type wide-angle lens system.

In order to obtain favorable optical performance over the entire vari-focal range of the zoom lens system comprising the first lens unit having the above-described composition, it is desirable to compose each of the lens units as described below. That is to say, the first lens unit is composed of at least one negative lens component and a positive lens component, the second lens unit is composed of at least one positive lens component and a negative lens component, the third lens unit is composed of at least two positive lens components and a negative lens component, and the fourth lens unit is composed of at least one positive lens component and a negative lens component. In addition, at least one aspherical surface is arranged in the zoom lens system according to the present invention.

Unlike the paraxial refractive power distribution, the thick lens components which are to be used for actually composing each of the lens units must be designed so as to concretely satisfy the characteristics of the zoom lens system.

The present invention is intended for composing a zoom lens system which covers a super wide field angle and its is therefore difficult, when the lens system is composed only of spherical lens components, to correct aberrations of the light bundle in the sagittal direction. For this reason, the first lens unit is composed of the negative lens component and the positive lens component, and the airspace reserved between these lens components is made as wide as possible. Owing to this design, a light bundle having a wide field angle is allowed to be incident on the positive lens at a narrow angle under the diverging function of the negative lens component. Though the above-mentioned airspace should desirably be as wide as possible, it cannot be made so wide for making the zoom lens system compact since the first lens unit is used as the front lens unit. For this reason, aberrations of the above-mentioned light bundle are corrected by using an aspherical surface and weakening the refractive power of the first lens unit to a certain degree, whereby the number of the lens components of the first lens unit can be reduced.

In order to reduce distortion, which is inherent in the wide-angle lens system, it is desirable to design the first lens unit so as to produce as little distortion as possible. Since this aberration is a function of field angle, it is desirable to correct the aberration by using an aspherical surface in the lens unit composed of a small number of lens components.

Further, lateral chromatic aberration constitutes a hindrance to enhancement of optical performance of the wide-angle lens system. The zoom lens system according to the present invention is designed so as to cancel the lateral chromatic aberration with the function of the air lens or correct the aberration with good balance by selecting an adequate glass material and an adequate refractive power distribution.

In the next place, the second lens unit of the zoom lens system according to the present invention is characterized in that it has a weak refractive power as a whole. It is desirable to compose the second lens unit of a negative lens component and a positive lens component with an airspace reserved between these lens components. The second lens unit is composed as described above so that axial aberrations and coma can be corrected with good balance in this lens unit. The second lens unit has another characteristic that its total refractive power may be positive or negative. The second lens unit has a further characteristic that it is composed of lens components having diameters smaller than those of the lens components of the first lens unit. It is effective for correcting spherical aberration to use an aspherical surface in the second lens unit. Furthermore, since the axial ray and the offaxial ray pass through different portions of the first lens unit, it is necessary to use an aspherical surface in the second lens unit for correcting coma in the zoom lens system when it is to have a large aperture.

The third lens unit has a diameter which is determined by the axial ray and contributes to correction of the axial aberrations at a higher degree than to correction of the offaxial aberrations since an aperture stop is arranged in the vicinity of the third lens unit. When an airspace is to be reserved in the third lens unit, it is located at the section within which the aberrations of high orders produced by the positive lens component and the negative lens component are to be balanced delicately. Speaking inversely, the third lens unit has high susceptibility to manufacturing errors of the lens components and a refractive power distribution must be selected elaborately for the third lens unit.

The fourth lens unit has a negative total refractive power, and is composed of a positive lens component and a negative lens component. If the fourth lens unit is composed of a single negative lens component, it must have rather a weakened refractive power and an undesirably enlarged diameter. Further, the rear principal point of the fourth lens unit must be located on the side of the image surface for obtaining an adequate back focal length of the zoom lens system. Ordinarily, the fourth lens unit is composed of a positive meniscus lens component and a negative lens component with an airspace reserved therebetween, which is utilized as an air lens for performing delicate control of the offaxial aberrations by producing aberrations of high orders. Further, the fourth lens unit comprises an aspherical surface for improving flatness of the image surface, thereby making it possible to lessen the burden the aberration correcting function imposed on the other lens component of the fourth lens unit and correct aberrations more favorably in the zoom lens system as a whole.

Moreover, in order to correct aberrations with good balance, it is more desirable to compose each of the lens units as described below.

The first lens unit must be designed so as to produce a few aberrations as possible since the aberrations produced by the first lens unit on which the offaxial principal ray is high can hardly be corrected by the subsequent lens units. Speaking concretely, it is necessary to design the first lens unit so as to produce coma, distortion and longitudinal chromatic aberration as little as possible. As for spherical aberration, it is dependent on the light bundle passing through the first lens unit and can be corrected by selecting a composition for the first lens unit as described later with reference to embodiments of the present invention.

The second lens unit and the third lens unit, on which heights of rays are similar to each other, are designed so as to produce spherical aberration, coma, longitudinal chromatic aberration, etc. having the signs reverse to each other for cancellation with each other.

The zoom lens system according to the present invention has aberrations, which are generally corrected favorably with good balance at each zooming state as described later with reference to embodiments of the present invention though distortion is a little remarkable at the wide position.

Further, aberrations are delicately balanced within the section of the air lens mostly by cancelling productions of the aberrations of high orders with each other.

The zoom lens system according to the present invention has a vari-focal ratio and optical performance which are enhanced by using the aspherical surfaces, and uses the lens components which have refractive powers weakened by lessing the aberration correcting burdens imposed thereon.

When the direction along the optical axis is taken as the x axis and the direction perpendicular to the optical axis is taken as the y axis, the aspherical surfaces used in the zoom lens system according to the present invention are expressed by the following formula:

$$x = \frac{y^2/r}{1 + \sqrt{1 - (y/r)^2}} + \Sigma A_{2i} y^{2i}$$

wherein the reference symbol r represents the radius of curvature of an aspherical surface of interest as measured in the vicinity of the optical axis (the radius of curvature of the reference sphere of the aspherical surface) and the reference symbol $A_{2i}$ designates the aspherical surface coefficient where i is the index of summation.

DETAILED DESCRIPTION OF THE PREFERRED EMBODIMENTS

Figure 1:
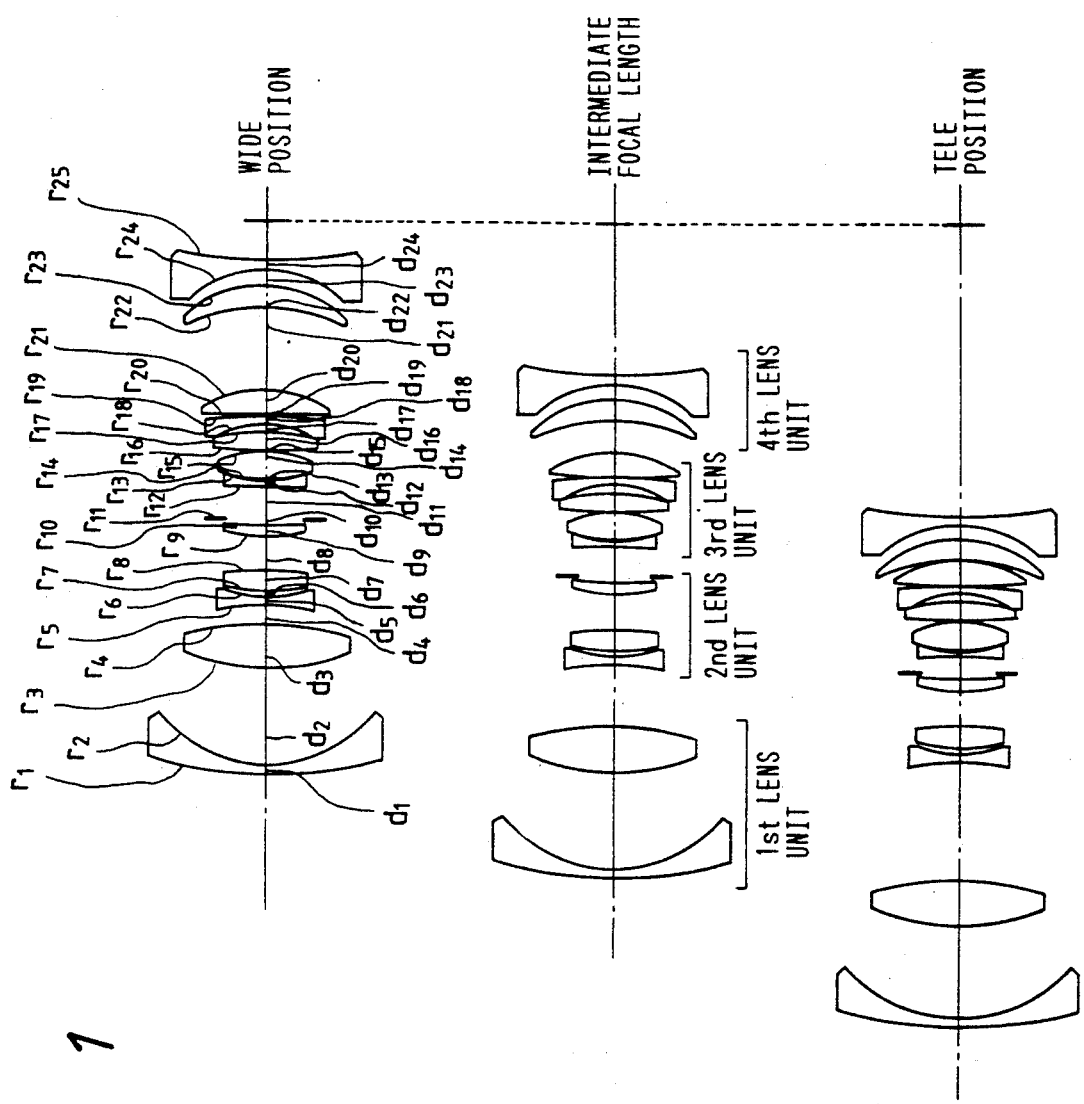
FIG. 1 through FIG. 6 show sectional views illustrating compositions of Embodiments 1 through 6 of the zoom lens system according to present invention.
Figure 2:
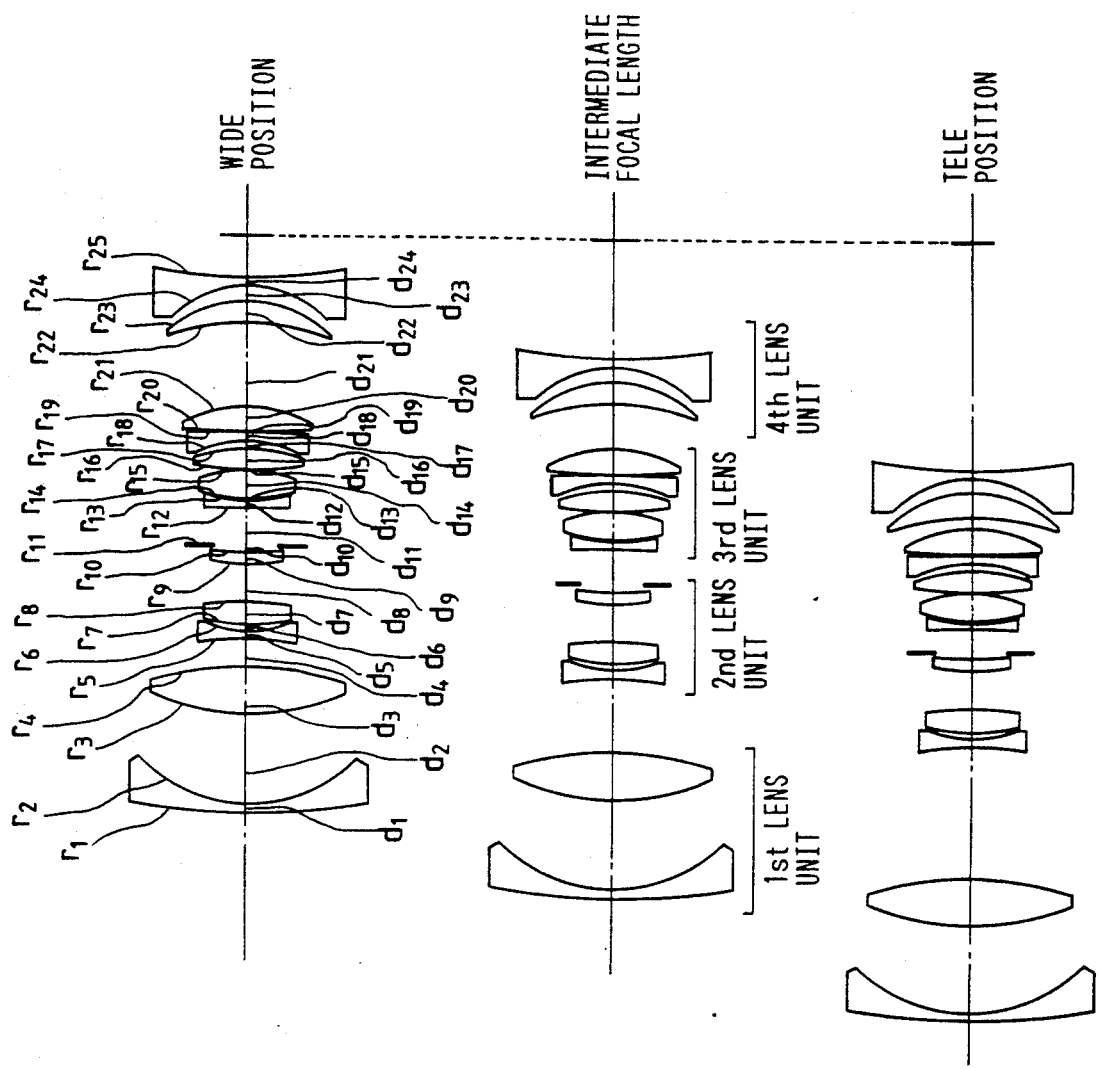
Figure 3:
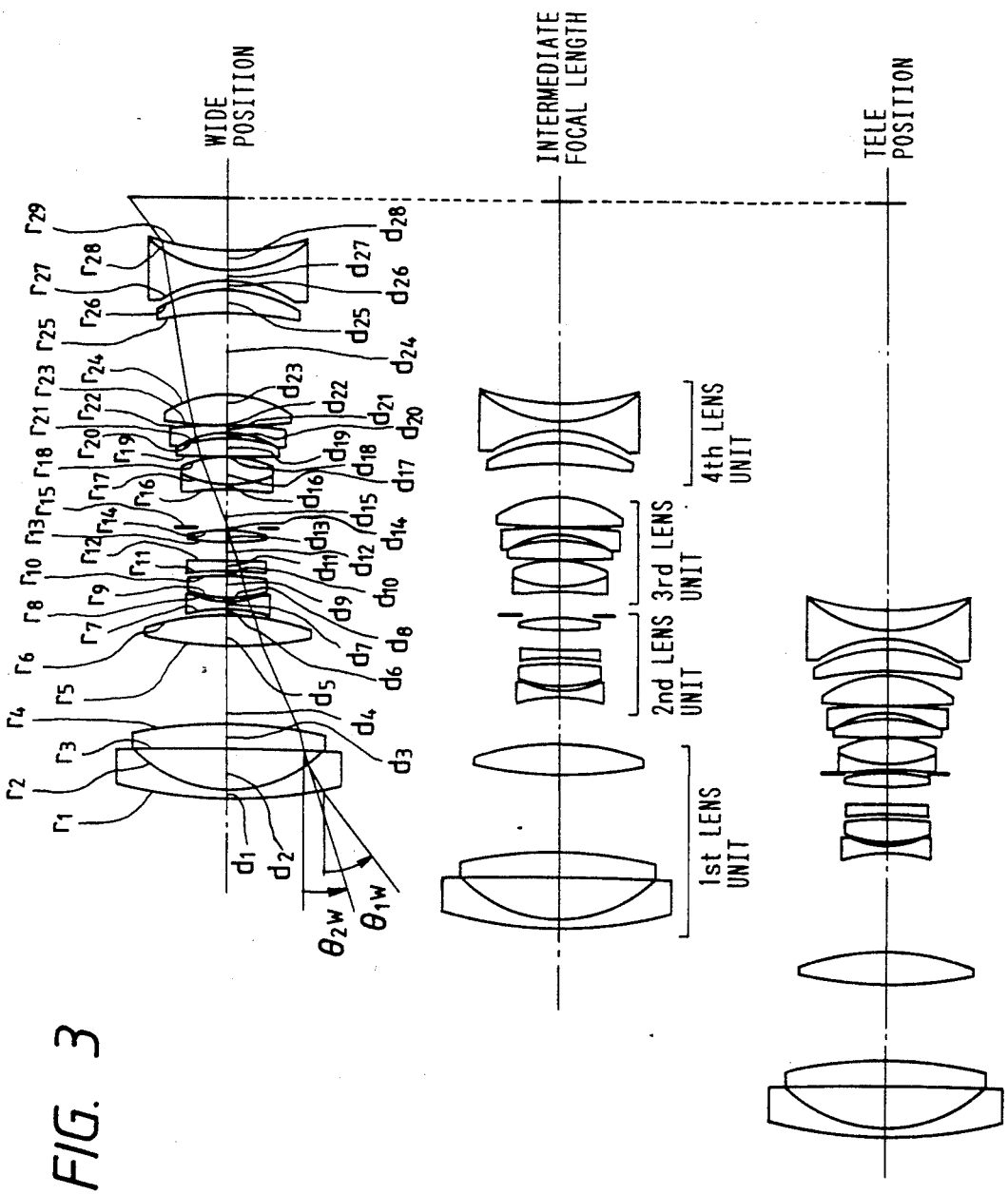
Figure 4:
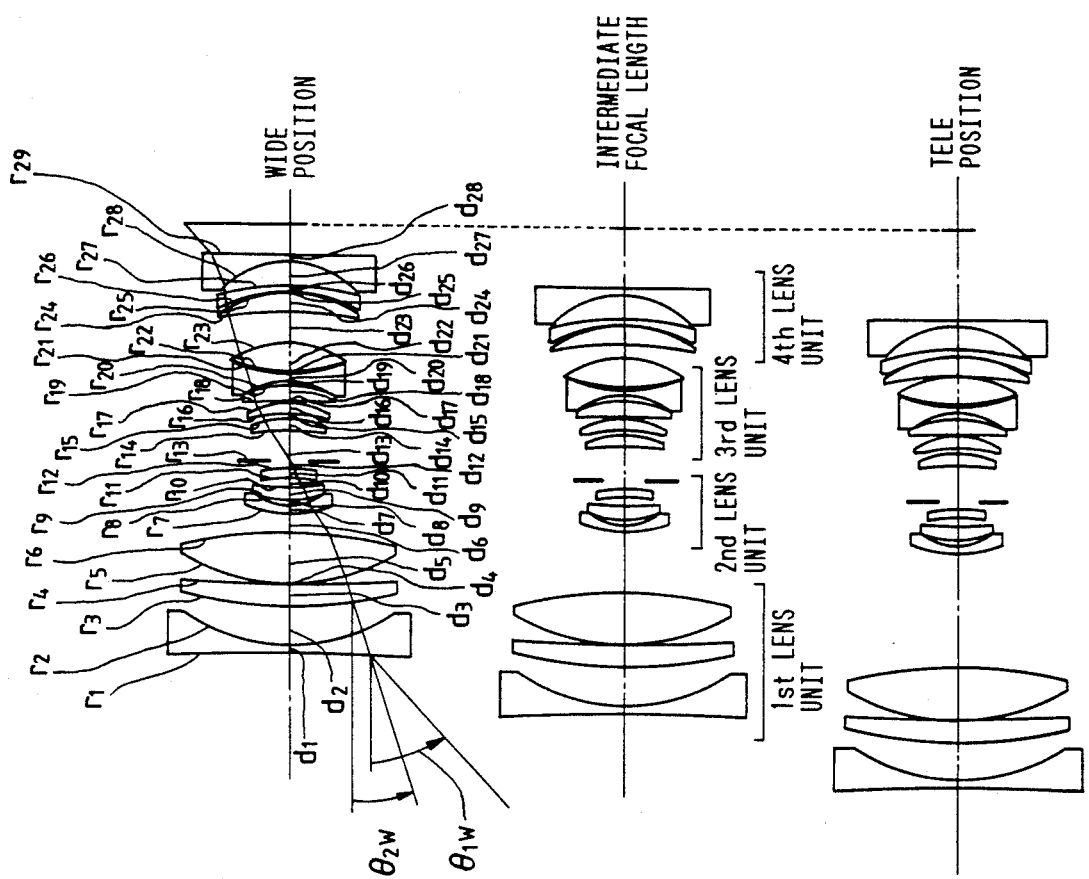
Figure 5:
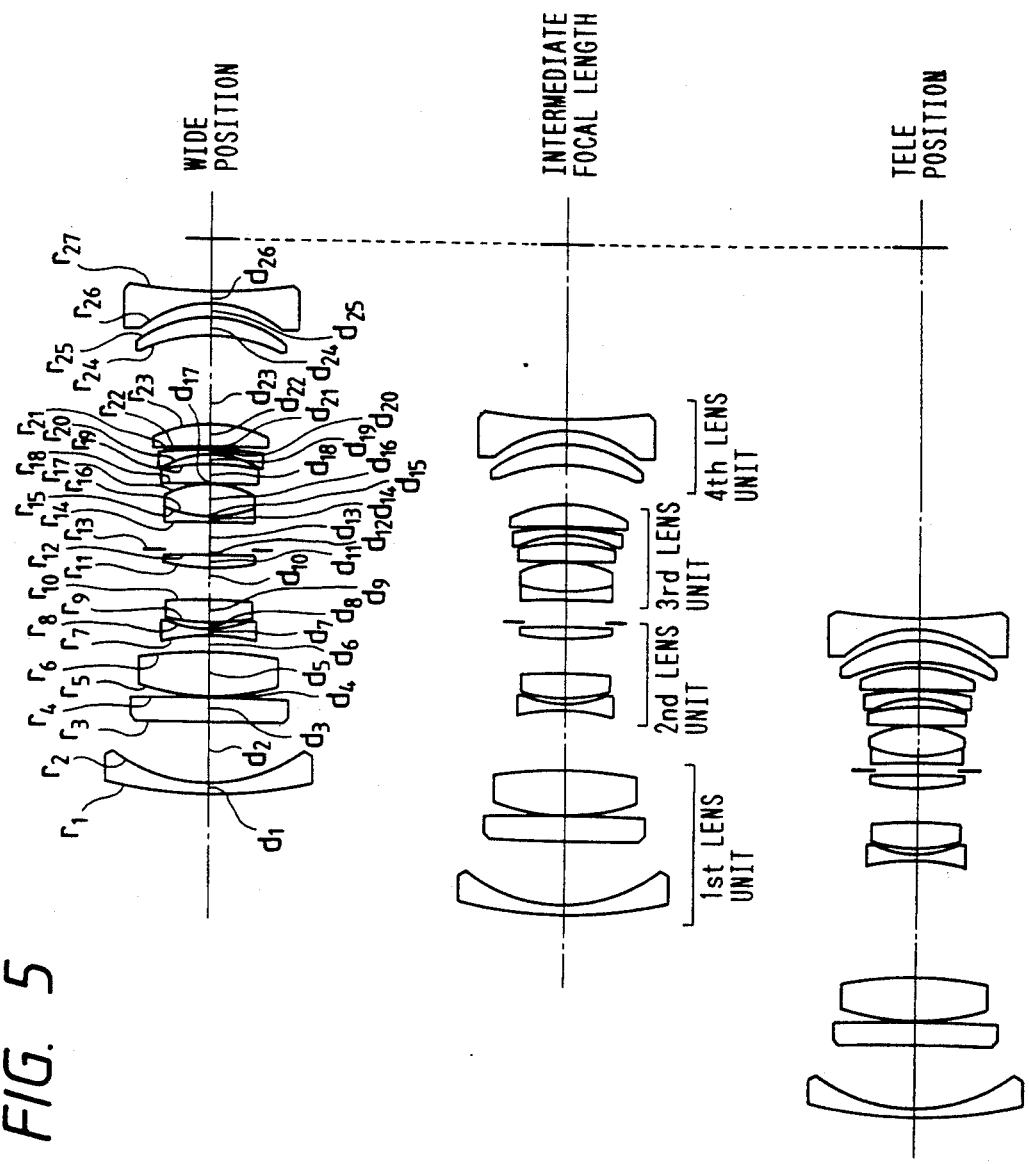
Figure 6:
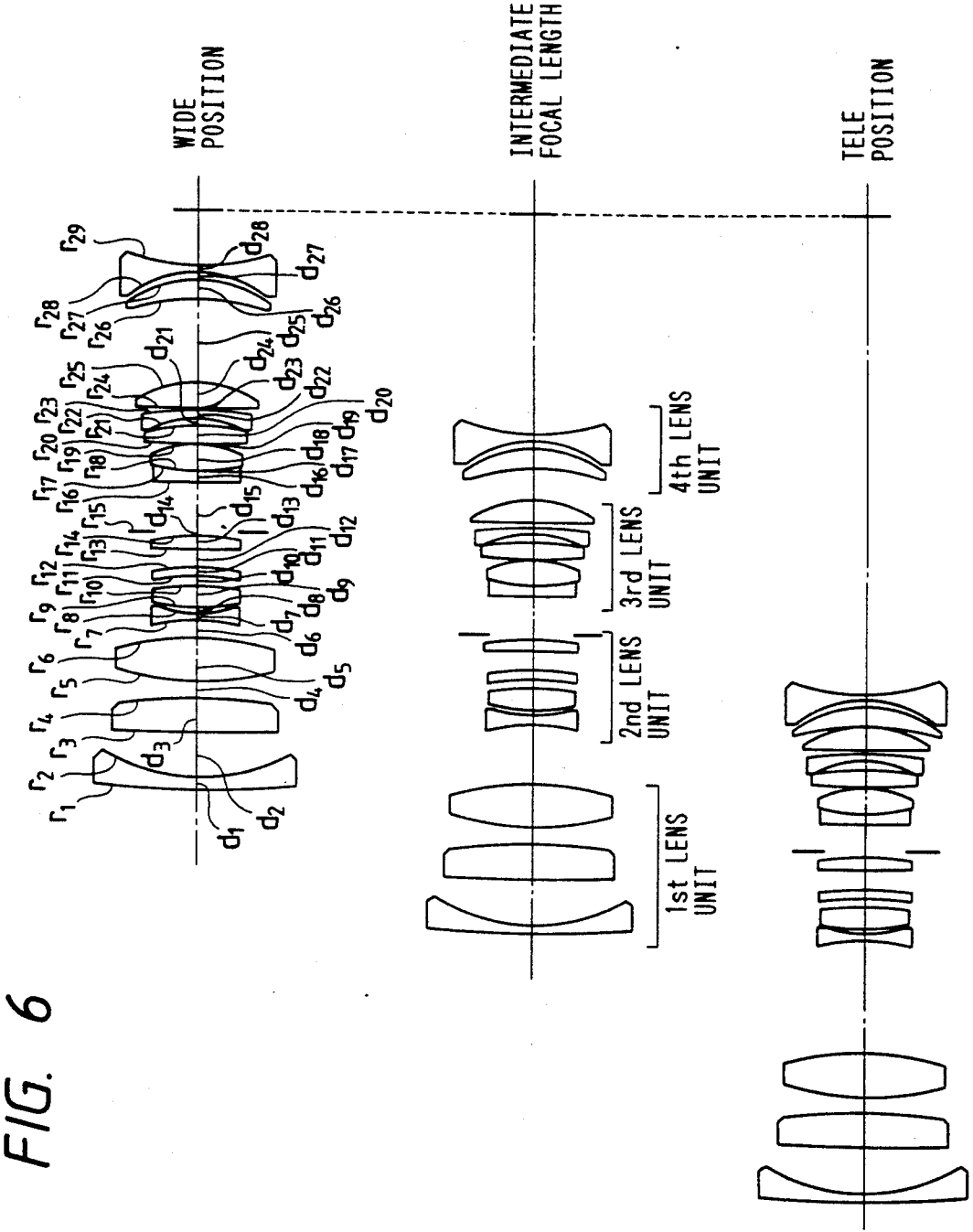

Now, the present invention will be described more detailedly below with reference to the preferred embodiments illustrated in the accompanying drawings and given in the form of the following numerical data:

---

Embodiment 1
 f = 24 mm ~ 58 mm,   F/4.18 ~ F/5.65
 2ω = 82° ~ 40°
---
$r_1$ = 76.6190

-continued

Embodiment 1 f = 24 mm ~ 58 mm,  F/4.18 ~ F/5.65
2ω = 82° ~ 40°

| | | |
|---|---|---|
| | $d_1 = 1.6000$ | $n_1 = 1.83400$ $\nu_1 = 37.16$ |
| $r_2 = 24.6980$ (aspherical surface) | | |
| | $d_2 = 16.5000$ | |
| $r_3 = 42.0390$ | | |
| | $d_3 = 7.6800$ | $n_2 = 1.60300$ $\nu_2 = 65.48$ |
| $r_4 = -58.4890$ | | |
| | $d_4 = D_1$ | (variable) |
| $r_5 = -44.3626$ | | |
| | $d_5 = 1.4000$ | $n_3 = 1.81554$ $\nu_3 = 44.36$ |
| $r_6 = 20.0947$ | | |
| | $d_6 = 0.8500$ | |
| $r_7 = 26.4670$ | | |
| | $d_7 = 3.8500$ | $n_4 = 1.80518$ $\nu_4 = 25.43$ |
| $r_8 = -78.3130$ | | |
| | $d_8 = 6.1670$ | |
| $r_9 = 32.2582$ | | |
| | $d_9 = 2.1500$ | $n_5 = 1.69680$ $\nu_5 = 55.52$ |
| $r_{10} = 81.5070$ | | |
| | $d_{10} = 1.1000$ | |
| $r_{11} = \infty$ (stop) | | |
| | $d_{11} = D_2$ | (variable) |
| $r_{12} = -289.4060$ | | |
| | $d_{12} = 1.2500$ | $n_6 = 1.83400$ $\nu_6 = 37.16$ |
| $r_{13} = 24.5970$ | | |
| | $d_{13} = 0.2000$ | |
| $r_{14} = 26.7460$ | | |
| | $d_{14} = 4.8500$ | $n_7 = 1.51728$ $\nu_7 = 69.56$ |
| $r_{15} = -19.7882$ | | |
| | $d_{15} = 0.2000$ | |
| $r_{16} = 173.8230$ | | |
| | $d_{16} = 3.2500$ | $n_8 = 1.73400$ $\nu_8 = 51.49$ |
| $r_{17} = -33.2600$ | | |
| | $d_{17} = 1.3830$ | |
| $r_{18} = -18.8350$ | | |
| | $d_{18} = 1.2500$ | $n_9 = 1.78470$ $\nu_9 = 26.22$ |
| $r_{19} = -157.4820$ | | |
| | $d_{19} = 0.3540$ | |
| $r_{20} = 398.7040$ | | |
| | $d_{20} = 4.0000$ | $n_{10} = 1.61700$ $\nu_{10} = 62.79$ |
| $r_{21} = -21.8080$ | | |
| | $d_{21} = D_3$ | (variable) |
| $r_{22} = -32.9125$ | | |
| | $d_{22} = 3.5500$ | $n_{11} = 1.84666$ $\nu_{11} = 23.78$ |
| $r_{23} = -21.1690$ | | |
| | $d_{23} = 3.0000$ | |
| $r_{24} = -18.2255$ (aspherical surface) | | |
| | $d_{24} = 1.5500$ | $n_{12} = 1.72600$ $\nu_{12} = 53.56$ |
| $r_{25} = 91.0620$ | | | aspherical surface coefficient
(2nd surface)

$A_4 = -0.45051 \times 10^{-7}$, $A_6 = -0.68995 \times 10^{-8}$
$A_8 = 0.18936 \times 10^{-10}$, $A_{10} = -0.42977 \times 10^{-13}$
(24th surface)
$A_4 = 0.69639 \times 10^{-5}$, $A_6 = -0.28030 \times 10^{-7}$
$A_8 = 0.20100 \times 10^{-9}$, $A_{10} = -0.77743 \times 10^{-12}$

| f | 24 | 37.8 | 58 |
|---|---|---|---|
| $D_1$ | 3.220 | 10.700 | 20.240 |
| $D_2$ | 5.730 | 5.070 | 2.460 |
| $D_3$ | 14.630 | 5.820 | 0.260 |

$\phi_2 = 0.000418$

Embodiment 2 f = 24 mm ~ 45 mm,  F/4.18 ~ F/5.65
2ω = 82° ~ 50°

| | | |
|---|---|---|
| $r_1 = 121.7980$ | | |
| | $d_1 = 1.6000$ | $n_1 = 1.83400$ $\nu_1 = 37.16$ |
| $r_2 = 26.1370$ (aspherical surface) | | |
| | $d_2 = 14.5000$ | |
| $r_3 = 41.9490$ | | |
| | $d_3 = 7.6800$ | $n_2 = 1.60300$ $\nu_2 = 65.48$ |
| $r_4 = -57.0270$ | | |
| | $d_4 = D_1$ | (variable) |
| $r_5 = -48.4880$ | | |
| | $d_5 = 1.4000$ | $n_3 = 1.83481$ $\nu_3 = 42.72$ |
| $r_6 = 20.6710$ | | |
| | $d_6 = 0.8500$ | |
| $r_7 = 27.4930$ | | |
| | $d_7 = 3.8500$ | $n_4 = 1.80518$ $\nu_4 = 25.43$ |
| $r_8 = -68.3880$ | | |
| | $d_8 = 6.1670$ | |
| $r_9 = 29.2940$ | | |
| | $d_9 = 2.1500$ | $n_5 = 1.69680$ $\nu_5 = 56.49$ |
| $r_{10} = 62.0170$ | | |
| | $d_{10} = 1.1000$ | |
| $r_{11} = \infty$ (stop) | | |
| | $d_{11} = D_2$ | (variable) |
| $r_{12} = -254.8130$ | | |
| | $d_{12} = 1.2500$ | $n_6 = 1.83400$ $\nu_6 = 37.16$ |
| $r_{13} = 27.5130$ | | |
| | $d_{13} = 0.2000$ | |
| $r_{14} = 30.5270$ | | |
| | $d_{14} = 4.8500$ | $n_7 = 1.51728$ $\nu_7 = 69.56$ |
| $r_{15} = -22.5110$ | | |
| | $d_{15} = 0.2000$ | |
| $r_{16} = 96.2380$ | | |
| | $d_{16} = 3.2500$ | $n_8 = 1.80400$ $\nu_8 = 46.57$ |
| $r_{17} = -30.9540$ | | |
| | $d_{17} = 1.3800$ | |
| $r_{18} = -19.4830$ | | |
| | $d_{18} = 1.2500$ | $n_9 = 1.78470$ $\nu_9 = 26.22$ |
| $r_{19} = 286.5450$ | | |
| | $d_{19} = 0.3500$ | |
| $r_{20} = 210.7450$ | | |
| | $d_{20} = 4.0000$ | $n_{10} = 1.61800$ $\nu_{10} = 63.38$ |
| $r_{21} = -22.3610$ | | |
| | $d_{21} = D_3$ | (variable) |
| $r_{22} = -36.9260$ | | |
| | $d_{22} = 3.5500$ | $n_{11} = 1.84666$ $\nu_{11} = 23.78$ |
| $r_{23} = -20.7310$ | | |
| | $d_{23} = 2.7290$ | |
| $r_{24} = -17.6050$ (aspherical surface) | | |
| | $d_{24} = 1.5500$ | $n_{12} = 1.78800$ $\nu_{12} = 47.38$ |
| $r_{25} = 112.5130$ | | | aspherical surface coefficient
(2nd surface)

$A_4 = 0.34692 \times 10^{-7}$, $A_6 = 0.82830 \times 10^{-9}$
$A_8 = -0.10559 \times 10^{-10}$, $A_{10} = 0.81596 \times 10^{-14}$
(24th surface)
$A_4 = 0.65257 \times 10^{-5}$, $A_6 = 0.25092 \times 10^{-8}$
$A_8 = 0.66515 \times 10^{-11}$, $A_{10} = -0.20944 \times 10^{-12}$

| f | 24 | 32.8 | 45 |
|---|---|---|---|
| $D_1$ | 4.520 | 12.000 | 21.540 |
| $D_2$ | 6.390 | 5.840 | 3.580 |
| $D_3$ | 14.000 | 7.360 | 2.010 |

$\phi_2 = 0.0015146$

Embodiment 3 f = 24.8 mm ~ 78 mm,  F/4.6 ~ F/7.6
2ω = 80° ~ 30°

| | | |
|---|---|---|
| $r_1 = 83.6960$ | | |
| | $d_1 = 1.8500$ | $n_1 = 1.83400$ $\nu_1 = 37.16$ |
| $r_2 = 24.9700$ (aspherical surface) | | |
| | $d_2 = 7.6270$ | |
| $r_3 = 7327.9700$ | | |
| | $d_3 = 4.4520$ | $n_2 = 1.59270$ $\nu_2 = 35.29$ |
| $r_4 = -81.9800$ | | |
| | $d_4 = 14.0330$ | |
| $r_5 = 72.0000$ | | |
| | $d_5 = 5.8500$ | $n_3 = 1.60300$ $\nu_3 = 65.48$ |
| $r_6 = -42.8520$ | | |
| | $d_6 = D_1$ | (variable) |
| $r_7 = -29.2728$ | | |
| | $d_7 = 1.4500$ | $n_4 = 1.83481$ $\nu_4 = 42.72$ |
| $r_8 = 18.5660$ | | |
| | $d_8 = 0.5394$ | |
| $r_9 = 21.8650$ | | |
| | $d_9 = 4.2500$ | $n_5 = 180518$ $\nu_5 = 25.43$ |
| $r_{10} = -88.3670$ | | |

-continued

Embodiment 3
f = 24.8 mm ~ 78 mm,    F/4.6 ~ F/7.6
2ω = 80° ~ 30°

| | | | |
|---|---|---|---|
| | $d_{10} = 0.9460$ | | |
| $r_{11} = -76.8780$ | | | |
| | $d_{11} = 1.7000$ | $n_6 = 1.83481$ | $\nu_6 = 42.72$ |
| $r_{12} = 559.7850$ | | | |
| | $d_{12} = 3.3558$ | | |
| $r_{13} = 47.7630$ | | | |
| | $d_{13} = 2.2000$ | $n_7 = 1.65128$ | $\nu_7 = 38.25$ |
| $r_{14} = -38.0844$ (aspherical surface) | | | |
| | $d_{14} = 0.3630$ | | |
| $r_{15} = \infty$ (stop) | | | |
| | $d_{15} = D_2$ | (variable) | |
| $r_{16} = -70.0460$ | | | |
| | $d_{16} = 1.2500$ | $n_8 = 1.83400$ | $\nu_8 = 37.16$ |
| $r_{17} = 23.8790$ | | | |
| | $d_{17} = 4.8500$ | $n_9 = 1.50743$ | $\nu_9 = 75.95$ |
| $r_{18} = -20.6750$ | | | |
| | $d_{18} = 0.1000$ | | |
| $r_{19} = -1305.7900$ | | | |
| | $d_{19} = 3.2500$ | $n_{10} = 1.81554$ | $\nu_{10} = 44.36$ |
| $r_{20} = -25.3720$ | | | |
| | $d_{20} = 0.9606$ | | |
| $r_{21} = -17.1230$ | | | |
| | $d_{21} = 1.2500$ | $n_{11} = 1.78470$ | $\nu_{11} = 26.22$ |
| $r_{22} = -127.0630$ | | | |
| | $d_{22} = 0.1000$ | | |
| $r_{23} = 205.7550$ | | | |
| | $d_{23} = 5.5000$ | $n_{12} = 1.60300$ | $\nu_{12} = 65.48$ |
| $r_{24} = -20.9360$ | | | |
| | $d_{24} = D_3$ | (variable) | |
| $r_{25} = -66.8130$ | | | |
| | $d_{25} = 4.1500$ | $n_{13} = 1.84666$ | $\nu_{13} = 23.78$ |
| $r_{26} = -25.6190$ | | | |
| | $d_{16} = 1.8096$ | | |
| $r_{27} = -21.4414$ (aspherical surface) | | | |
| | $d_{27} = 1.8500$ | $n_{14} = 1.81554$ | $\nu_{14} = 44.36$ |
| $r_{28} = 23.5730$ | | | |
| | $d_{28} = 3.2500$ | $n_{15} = 1.80207$ | $\nu_{15} = 30.20$ |
| $r_{29} = 45.1600$ | | | | aspherical surface coefficient
(2nd surface)
$A_4 = -0.33861 \times 10^{-6}$, $A_6 = -0.14340 \times 10^{-8}$
$A_8 = -0.18720 \times 10^{-11}$, $A_{10} = -0.10144 \times 10^{-13}$
(14th surface)
$A_4 = 0.33955 \times 10^{-5}$, $A_6 = 0.10323 \times 10^{-7}$
$A_8 = -0.14099 \times 10^{-8}$, $A_{10} = 0.11055 \times 10^{-10}$
(27th surface)
$A_4 = 0.63950 \times 10^{-5}$, $A_6 = -0.39890 \times 10^{-7}$
$A_8 = 0.26623 \times 10^{-9}$, $A_{10} = -0.71277 \times 10^{-12}$

| f | 24.8 | 44.9 | 78 |
|---|---|---|---|
| $D_1$ | 0.980 | 8.460 | 18.000 |
| $D_2$ | 7.172 | 4.527 | 0.353 |
| $D_3$ | 14.898 | 6.006 | 0.738 |

$\phi_2 = 0.00215196$

Embodiment 4
f = 21.585 mm ~ 32.85 mm,    F/4.5 ~ F/5.65
2ω = 88° ~ 66°

| | | | |
|---|---|---|---|
| $r_1 = -339.7273$ | | | |
| | $d_1 = 1.4000$ | $n_1 = 1.85026$ | $\nu_1 = 32.28$ |
| $r_2 = 34.8367$ | | | |
| | $d_2 = 6.7792$ | | |
| $r_3 = 83.7098$ | | | |
| | $d_3 = 4.0250$ | $n_2 = 1.60300$ | $\nu_2 = 65.48$ |
| $r_4 = 327.4126$ | | | |
| | $d_4 = 0.1000$ | | |
| $r_5 = 39.1459$ | | | |
| | $d_5 = 9.3653$ | $n_3 = 1.57444$ | $\nu_3 = 56.47$ |
| $r_6 = -79.0262$ | | | |
| | $d_6 = D_1$ | (variable) | |
| $r_7 = 22.6291$ | | | |
| | $d_7 = 1.4000$ | $n_4 = 1.75700$ | $\nu_4 = 47.87$ |
| $r_8 = 9.9510$ | | | |
| | $d_8 = 1.0019$ | | |
| $r_9 = 17.5753$ | | | |

-continued

Embodiment 4
f = 21.585 mm ~ 32.85 mm,    F/4.5 ~ F/5.65
2ω = 88° ~ 66°

| | | | |
|---|---|---|---|
| | $d_9 = 2.5000$ | $n_5 = 1.80518$ | $\nu_5 = 25.43$ |
| $r_{10} = 65.8266$ | | | |
| | $d_{10} = 1.6440$ | | |
| $r_{11} = -26.4053$ | | | |
| | $d_{11} = 1.7000$ | $n_6 = 1.69680$ | $\nu_6 = 56.49$ |
| $r_{12} = -26.1199$ | | | |
| | $d_{12} = 1.1000$ | | |
| $r_{13} = \infty$ (stop) | | | |
| | $d_{13} = D_2$ | (variable) | |
| $r_{14} = -46.6740$ | | | |
| | $d_{14} = 2.1800$ | $n_7 = 1.60300$ | $\nu_7 = 65.48$ |
| $r_{15} = -20.1338$ | | | |
| | $d_{15} = 0.8500$ | | |
| $r_{16} = -27.5313$ (aspherical surface) | | | |
| | $d_{16} = 2.2500$ | $n_8 = 1.48749$ | $\nu_8 = 70.20$ |
| $r_{17} = -13.5722$ | | | |
| | $d_{17} = 0.2000$ | | |
| $r_{18} = -161.1158$ | | | |
| | $d_{18} = 3.0500$ | $n_9 = 1.73400$ | $\nu_9 = 51.49$ |
| $r_{19} = -17.7338$ | | | |
| | $d_{19} = 0.8830$ | | |
| $r_{20} = -13.4699$ | | | |
| | $d_{20} = 1.2500$ | $n_{10} = 1.69895$ | $\nu_{10} = 30.12$ |
| $r_{21} = -32.3737$ | | | |
| | $d_{21} = 0.3540$ | | |
| $r_{22} = 35.1267$ | | | |
| | $d_{22} = 5.0500$ | $n_{11} = 1.60300$ | $\nu_{11} = 65.48$ |
| $r_{23} = -19.6850$ | | | |
| | $d_{23} = D_3$ | (variable) | |
| $r_{24} = -71.1125$ | | | |
| | $d_{24} = 3.5500$ | $n_{12} = 1.84666$ | $\nu_{12} = 23.78$ |
| $r_{25} = -22.7892$ | | | |
| | $d_{25} = 0.1500$ | | |
| $r_{26} = -25.2759$ | | | |
| | $d_{26} = 1.1400$ | $n_{13} = 1.84666$ | $\nu_{13} = 23.88$ |
| $r_{27} = -44.0253$ | | | |
| | $d_{27} = 4.3383$ | | |
| $r_{28} = -15.2523$ (aspherical surface) | | | |
| | $d_{28} = 1.1000$ | $n_{14} = 1.83481$ | $\nu_{14} = 42.72$ |
| $r_{29} = 2407.1072$ | | | | aspherical surface coefficient
(16th surface)
$A_4 = -0.41714 \times 10^{-5}$, $A_6 = 0.42167 \times 10^{-7}$
$A_8 = 0.92130 \times 10^{-9}$, $A_{10} = 0.17517 \times 10^{-10}$
(28th surface)
$A_4 = 0.25829 \times 10^{-4}$, $A_6 = 0.12129 \times 10^{-6}$
$A_8 = -0.33129 \times 10^{-9}$, $A_{10} = 0.24481 \times 10^{-11}$

| f | 21.585 | 26.6 | 32.85 |
|---|---|---|---|
| $D_1$ | 3.651 | 11.131 | 20.671 |
| $D_2$ | 5.603 | 6.151 | 6.609 |
| $D_3$ | 5.820 | 2.538 | 0.100 |

$\phi_2 = -0.005259$

Embodiment 5
f = 28.5 mm ~ 82 mm,    F/4.6 ~ F/6.2
2ω = 72° ~ 28°

| | | | |
|---|---|---|---|
| $r_1 = 82.5140$ | | | |
| | $d_1 = 1.6000$ | $n_1 = 1.83400$ | $\nu_1 = 37.16$ |
| $r_2 = 27.0930$ (aspherical surface) | | | |
| | $d_2 = 10.5690$ | | |
| $r_3 = 555.8400$ | | | |
| | $d_3 = 4.1240$ | $n_2 = 1.72000$ | $\nu_2 = 46.03$ |
| $r_4 = -970.8180$ | | | |
| | $d_4 = 0.2000$ | | |
| $r_5 = 38.5600$ | | | |
| | $d_5 = 7.7500$ | $n_3 = 1.60300$ | $\nu_3 = 65.48$ |
| $r_6 = -61.5070$ | | | |
| | $d_6 = D_1$ | (variable) | |
| $r_7 = -39.3290$ | | | |
| | $d_7 = 1.4500$ | $n_4 = 1.81554$ | $\nu_4 = 44.36$ |
| $r_8 = 19.5737$ | | | |
| | $d_8 = 0.8500$ | | |
| $r_9 = 26.4526$ | | | |
| | $d_9 = 4.2500$ | $n_5 = 1.80518$ | $\nu_5 = 25.43$ |

-continued

Embodiment 5 f = 28.5 mm ~ 82 mm,    F/4.6 ~ F/6.2
2ω = 72° ~ 28°

$r_{10} = -78.4860$
$\quad d_{10} = 5.6250$
$r_{11} = 54.3900$
$\quad d_{11} = 2.1500 \quad n_6 = 1.69680 \quad \nu_6 = 56.49$
$r_{12} = -572.9500$
$\quad d_{12} = 1.1000$
$r_{13} = \infty \text{ (stop)}$
$\quad d_{13} = D_2 \quad \text{(variable)}$
$r_{14} = -206.5000$
$\quad d_{14} = 1.2500 \quad n_7 = 1.83400 \quad \nu_7 = 37.16$
$r_{15} = 24.0830$
$\quad d_{15} = 0.2000$
$r_{16} = 26.6720$
$\quad d_{16} = 4.8500 \quad n_8 = 1.51728 \quad \nu_8 = 69.56$
$r_{17} = -18.6150$
$\quad d_{17} = 0.2000$
$r_{18} = 573.9270$
$\quad d_{18} = 3.2500 \quad n_9 = 1.73400 \quad \nu_9 = 51.49$
$r_{19} = -34.0480$
$\quad d_{19} = 1.3830$
$r_{20} = -18.2100$
$\quad d_{20} = 1.2500 \quad n_{10} = 1.78470 \quad \nu_{10} = 26.22$
$r_{21} = -60.8420$
$\quad d_{21} = 0.3540$
$r_{22} = -122.1990$
$\quad d_{22} = 4.000 \quad n_{11} = 1.61700 \quad \nu_{11} = 62.79$
$r_{23} = -19.7385$
$\quad d_{23} = D_3 \quad \text{(variable)}$
$r_{24} = -30.1830$
$\quad d_{24} = 3.5500 \quad n_{12} = 1.84666 \quad \nu_{12} = 23.78$
$r_{25} = -19.8169$
$\quad d_{25} = 2.4500$
$r_{26} = -17.1600 \text{ (aspherical surface)}$
$\quad d_{26} = 1.5500 \quad n_{13} = 1.72600 \quad \nu_{13} = 53.56$
$r_{27} = 84.4860$ aspherical surface coefficient
(2nd surface)
$A_4 = 0.98562 \times 10^{-6}, A_6 = -0.65878 \times 10^{-8}$
$A_8 = 0.27811 \times 10^{-10}, A_{10} = -0.46423 \times 10^{-13}$
(26th surface)
$A_4 = 0.10918 \times 10^{-4}, A_6 = -0.42825 \times 10^{-7}$
$A_8 = 0.37441 \times 10^{-9}, A_{10} = -0.58331 \times 10^{-12}$

| f | 28.5 | 48.3 | 82 |
|---|---|---|---|
| $D_1$ | 2.520 | 10.000 | 19.540 |
| $D_2$ | 4.770 | 3.820 | 0.990 |
| $D_3$ | 14.600 | 6.440 | 0.500 |

$\phi_2 = -0.0012929$

Embodiment 6 f = 28.6 mm ~ 102 mm,    F/4.65 ~ F/7.64
2ω = 72° ~ 24°

$r_1 = 277.3145$
$\quad d_1 = 1.4500 \quad n_1 = 1.83400 \quad \nu_1 = 37.16$
$r_2 = 33.6428 \text{ (aspherical surface)}$
$\quad d_2 = 8.6961$
$r_3 = 1318.5041$
$\quad d_3 = 5.8000 \quad n_2 = 1.67000 \quad \nu_2 = 57.33$
$r_4 = -160.9367$
$\quad d_4 = 3.0740$
$r_5 = 50.6574$
$\quad d_5 = 8.0469 \quad n_3 = 1.60300 \quad \nu_3 = 65.48$
$r_6 = -51.2298$
$\quad d_6 = D_1 \quad \text{(variable)}$
$r_7 = -30.7906$
$\quad d_7 = 1.4500 \quad n_4 = 1.83481 \quad \nu_4 = 42.72$
$r_8 = 24.0710$
$\quad d_8 = 0.7678$
$r_9 = 31.9068$
$\quad d_9 = 4.2500 \quad n_5 = 1.80518 \quad \nu_5 = 25.43$
$r_{10} = -60.1435$
$\quad d_{10} = 1.4107$
$r_{11} = -52.3708 \text{ (aspherical surface)}$
$\quad d_{11} = 1.7000 \quad n_6 = 1.83481 \quad \nu_6 = 42.72$
$r_{12} = -50.6366$ -continued

Embodiment 6 f = 28.6 mm ~ 102 mm,    F/4.65 ~ F/7.64
2ω = 72° ~ 24°

$\quad d_{12} = 3.4578$
$r_{13} = -1960.4425$
$\quad d_{13} = 2.2000 \quad n_7 = 1.69680 \quad \nu_7 = 56.49$
$r_{14} = -49.4049$
$\quad d_{14} = 1.1000$
$r_{15} = \infty \text{ (stop)}$
$\quad d_{15} = D_2 \quad \text{(variable)}$
$r_{16} = -163.9331$
$\quad d_{16} = 1.2500 \quad n_8 = 1.83400 \quad \nu_8 = 37.16$
$r_{17} = 27.1270$
$\quad d_{17} = 0.2015$
$r_{18} = 28.3458$
$\quad d_{18} = 4.8500 \quad n_9 = 1.51728 \quad \nu_9 = 69.56$
$r_{19} = -19.4610$
$\quad d_{19} = 0.2151$
$r_{20} = 237.0372$
$\quad d_{20} = 3.2500 \quad n_{10} = 1.69942 \quad \nu_{10} = 45.25$
$r_{21} = -38.0706$
$\quad d_{21} = 1.3243$
$r_{22} = -18.4688$
$\quad d_{22} = 1.2500 \quad n_{11} = 1.78380 \quad \nu_{11} = 26.12$
$r_{23} = -68.7715$
$\quad d_{23} = 0.8112$
$r_{24} = -754.7782$
$\quad d_{24} = 4.0000 \quad n_{12} = 1.61700 \quad \nu_{12} = 62.79$
$r_{25} = -21.2998$
$\quad d_{25} = D_3 \quad \text{(variable)}$
$r_{26} = -47.1603$
$\quad d_{26} = 3.5500 \quad n_{13} = 1.84666 \quad \nu_{13} = 23.78$
$r_{27} = -22.9476$
$\quad d_{27} = 1.3024$
$r_{28} = -19.6796 \text{ (aspherical surface)}$
$\quad d_{28} = 0.8500 \quad n_{14} = 1.72600 \quad \nu_{14} = 53.56$
$r_{29} = 38.2560$ aspherical surface coefficient
(2nd surface)
$A_4 = 0.80884 \times 10^{-6}, A_6 = 0.39895 \times 10^{-9}$
$A_8 = 0.63256 \times 10^{-11}, A_{10} = -0.14867 \times 10^{-13}$
(11th surface)
$A_4 = -0.57668 \times 10^{-6}, A_6 = 0.62593 \times 10^{-8}$
$A_8 = 0.73608 \times 10^{-10}, A_{10} = -0.30724 \times 10^{-12}$
(28th surface)
$A_4 = 0.97270 \times 10^{-5}, A_6 = -0.40654 \times 10^{-8}$
$A_8 = -0.32428 \times 10^{-11}, A_{10} = -0.21138 \times 10^{-12}$

| f | 28.65 | 54.0 | 102 |
|---|---|---|---|
| $D_1$ | 3.115 | 10.595 | 20.135 |
| $D_2$ | 9.133 | 7.084 | 4.946 |
| $D_3$ | 14.660 | 5.645 | 0.005 |

$\phi_2 = -0.0008807$ wherein the reference symbols $r_1, r_2, \ldots$ represent the radii of curvature on the surfaces of the respective lens elements, the reference symbols $d_1, d_2, \ldots$ designate the thicknesses of the respective lens elements and the airspaces reserved therebetween, the reference symbols $n_1, n_2, \ldots$ denote the refractive indices of the respective lens elements, and the reference symbols $\nu_1, \nu_2, \ldots$ represent the Abbe's numbers of the respective lens elements.

The Embodiments 1 through 3 are designed as super wide-angle zoom lens systems having field angles on the order of 84° at the wide positions thereof.

In each of these embodiments, the first lens unit is composed of a first negative lens component and a second positive lens component which are arranged with an airspace reserved therebetween so that the lens unit has a diverging function and a role to transmit an incident light bundle as a light bundle which is not inclined so much relative to the optical axis. The second lens unit is composed of a negative lens component and a positive lens component, and has a relatively weak refractive power according to the paraxial refractive power distribution selected for the first lens unit and the second lens unit. Accordingly, it is sufficient to use two or three lens elements for composing the second lens unit. The third lens unit has a composition which is similar to that of an ordinary imaging lens unit, and is composed of a triplet and a doublet for favorably correcting spherical aberration. Further, the fourth lens unit is designed as a doublet consisting of a positive lens component and a negative lens component which are arranged with an airspace reserved therebetween. In the Embodiment 3, the negative lens component arranged in the fourth lens unit is designed as a cemented doublet for correcting chromatic aberration more favorably.

The Embodiments 1 through 3 have a common characteristic in the airspace reserved in the first lens unit, and are designed as zoom lens systems having high vari-focal ratios and zooming ranges covering regions from a super wide field angle to another field angle corresponding to that of a quasi-telephoto lens system.

Figure 7:
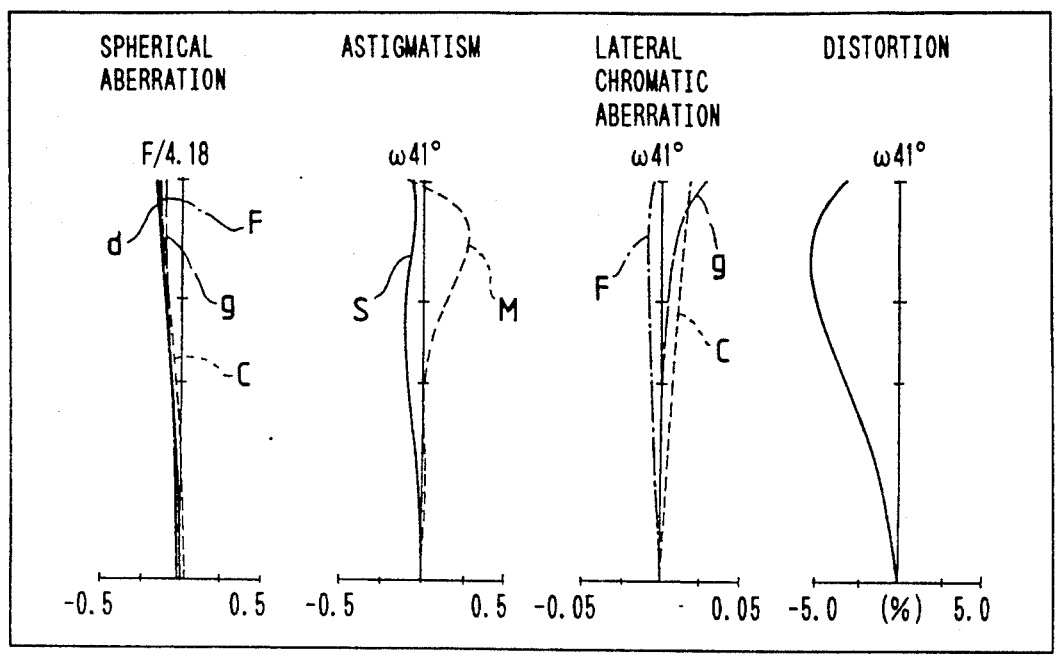
FIG. 7 through FIG. 9 show graphs illustrating aberration characteristics of the Embodiment 1 of the present invention.
Figure 8:
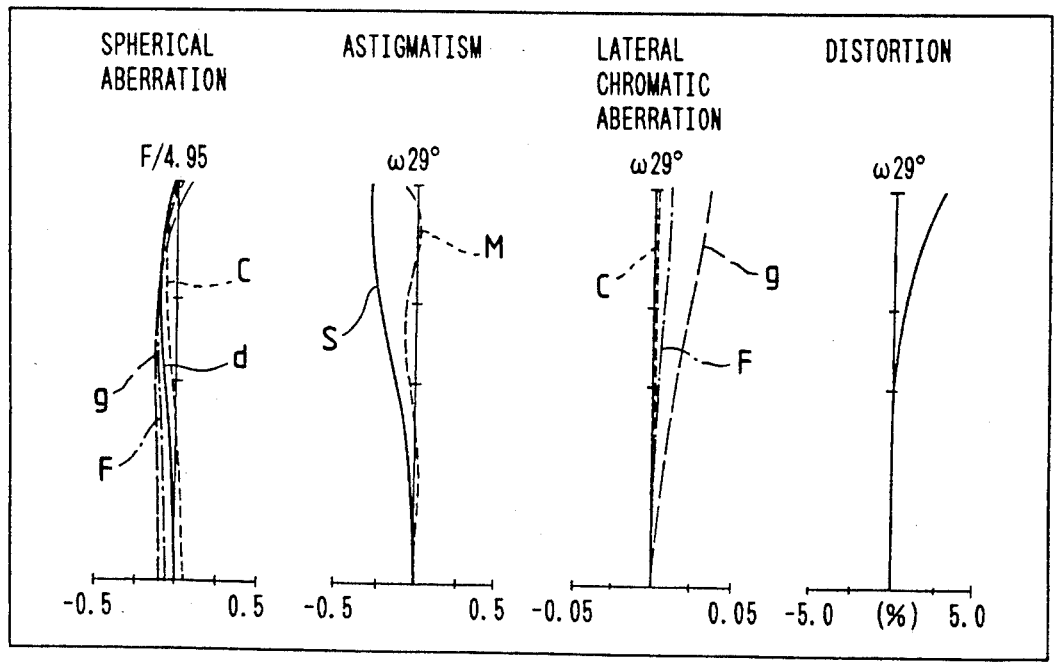
Figure 9:
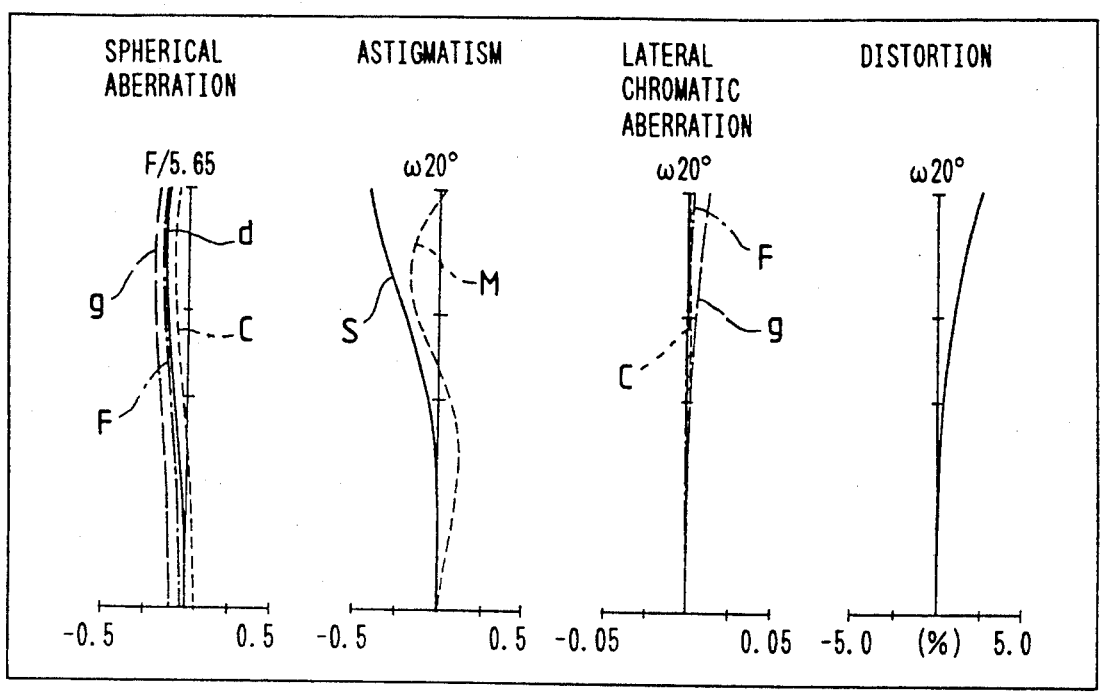
Figure 10:
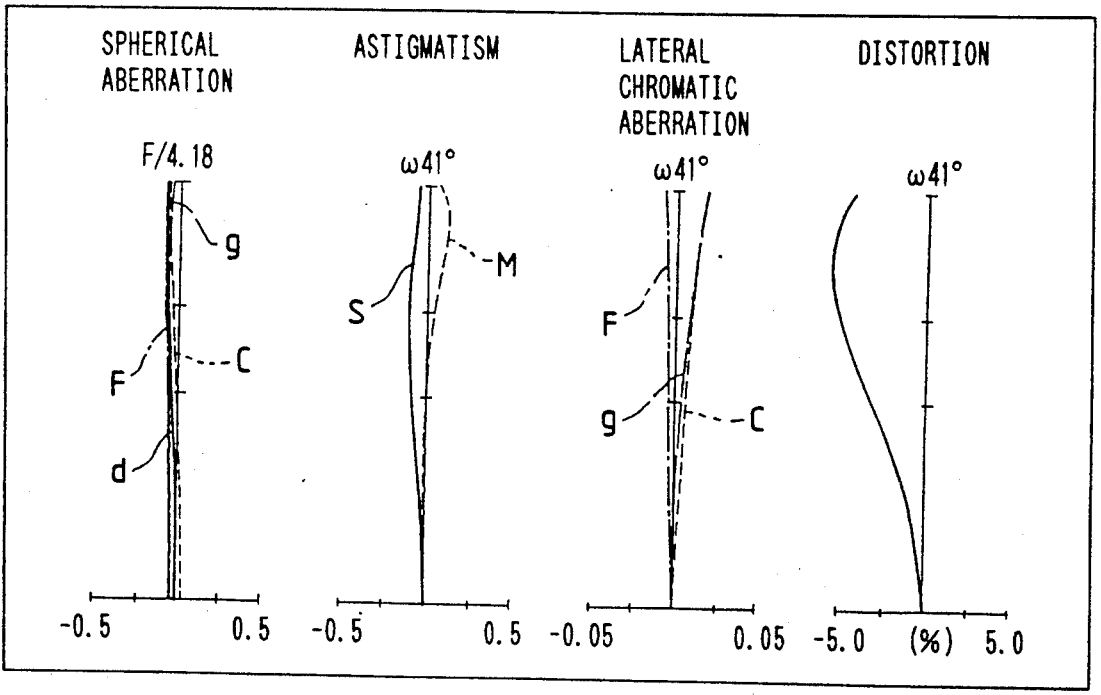
FIG. 10 through FIG. 12 show graphs illustrating aberration characteristics of the Embodiment 2 of the present invention.
Figure 11:
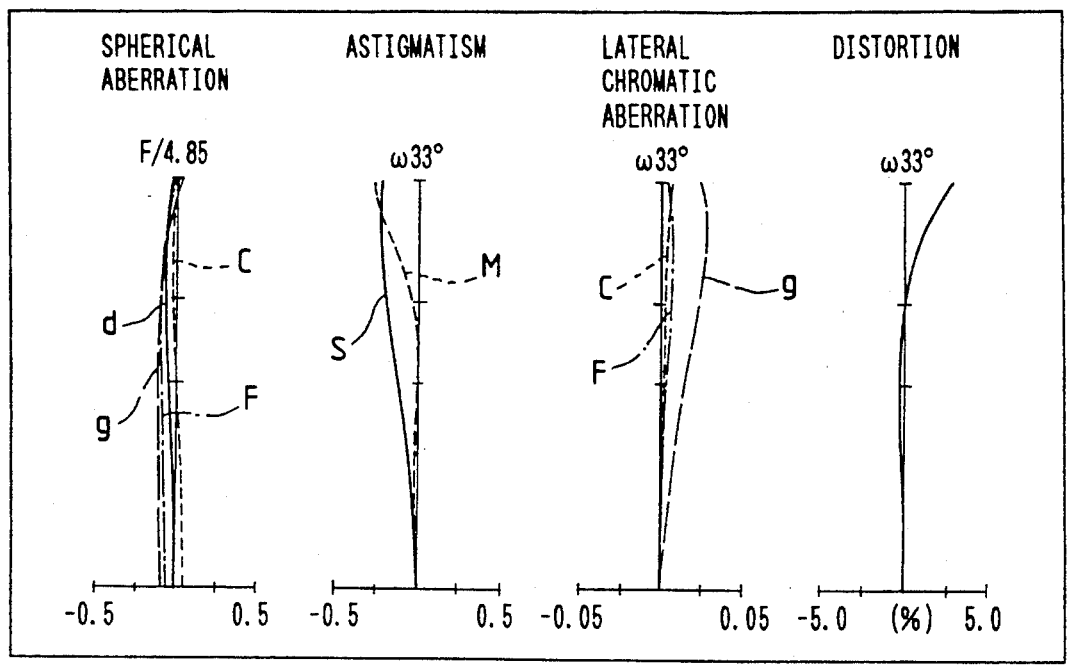
Figure 12:
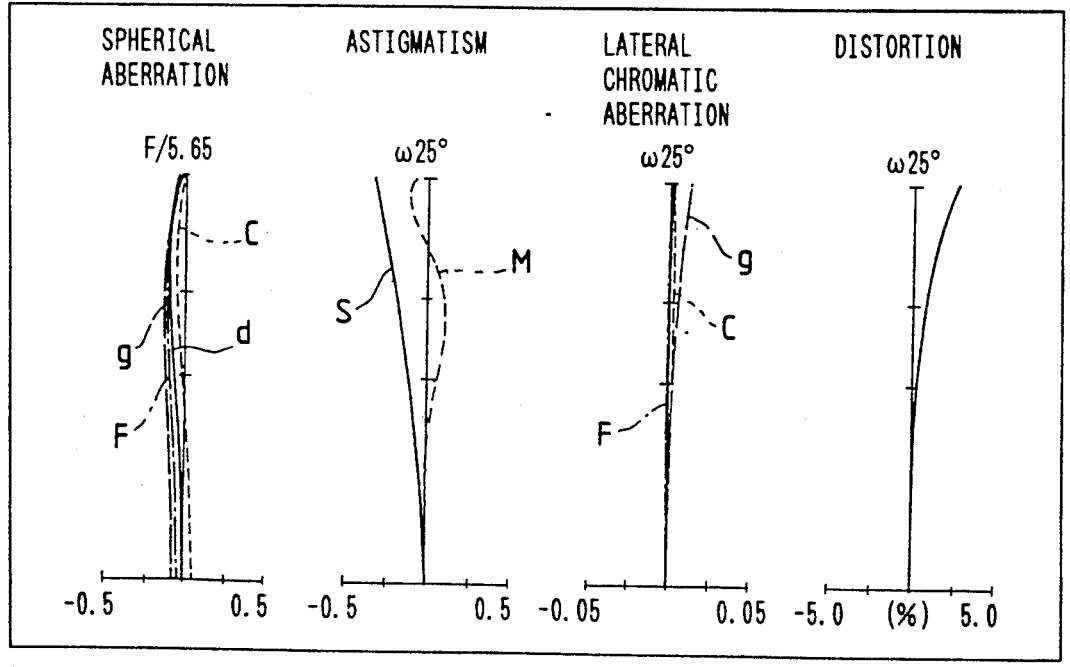
Figure 13:
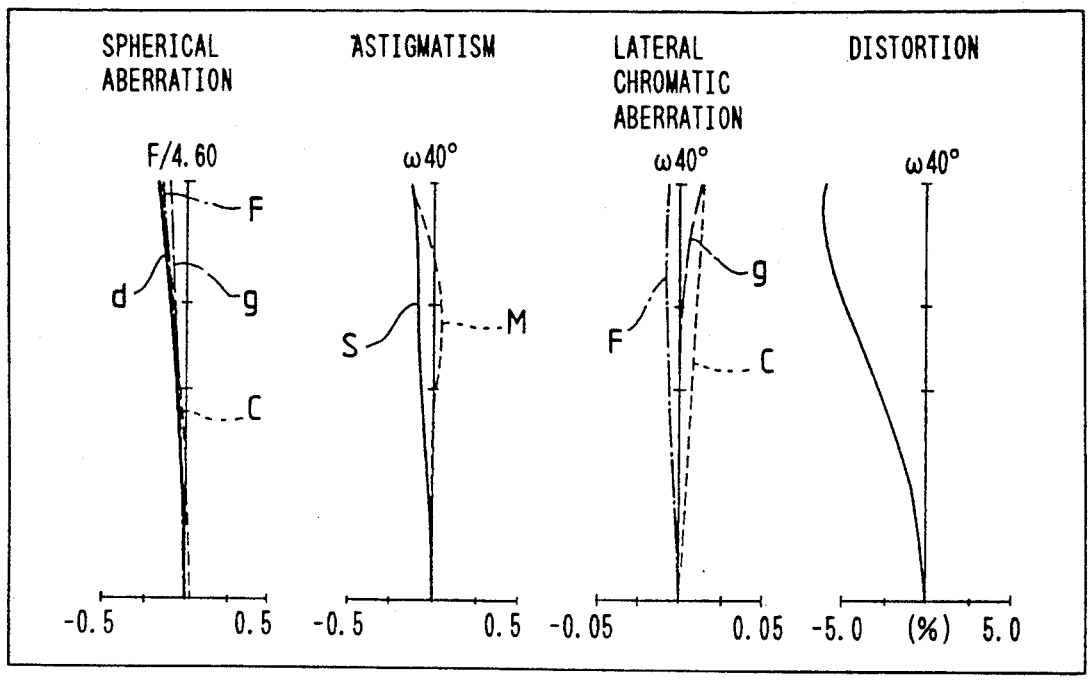
FIG. 13 through FIG. 15 show curves illustrating aberration characteristics of the Embodiment 3 of the present invention.
Figure 14:
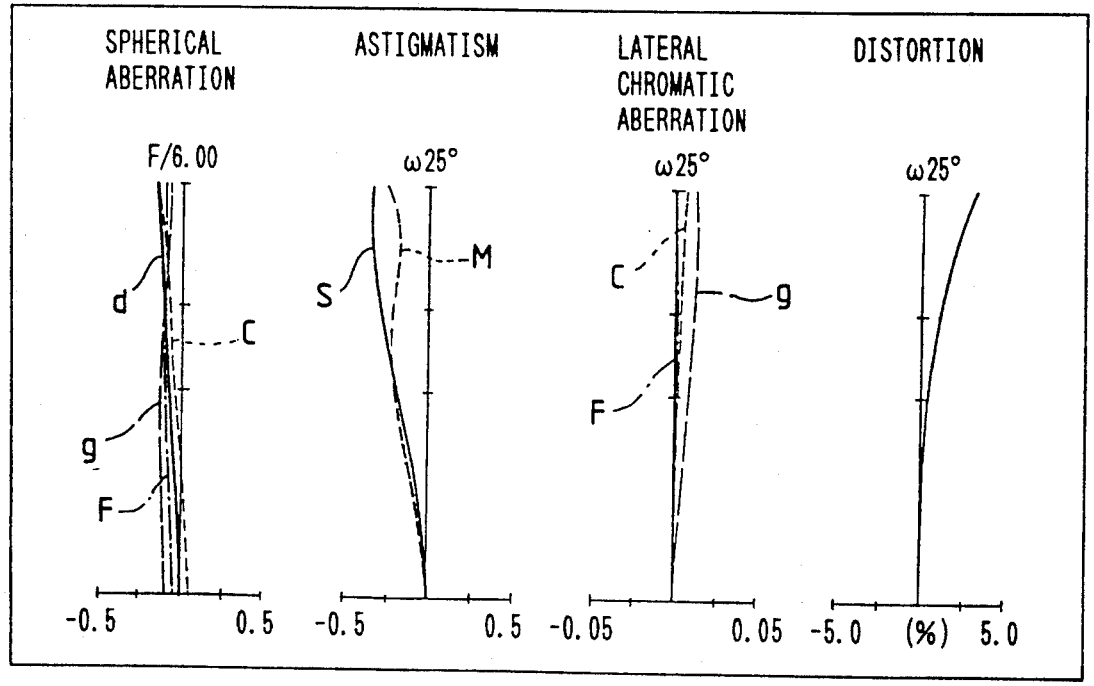
Figure 15:
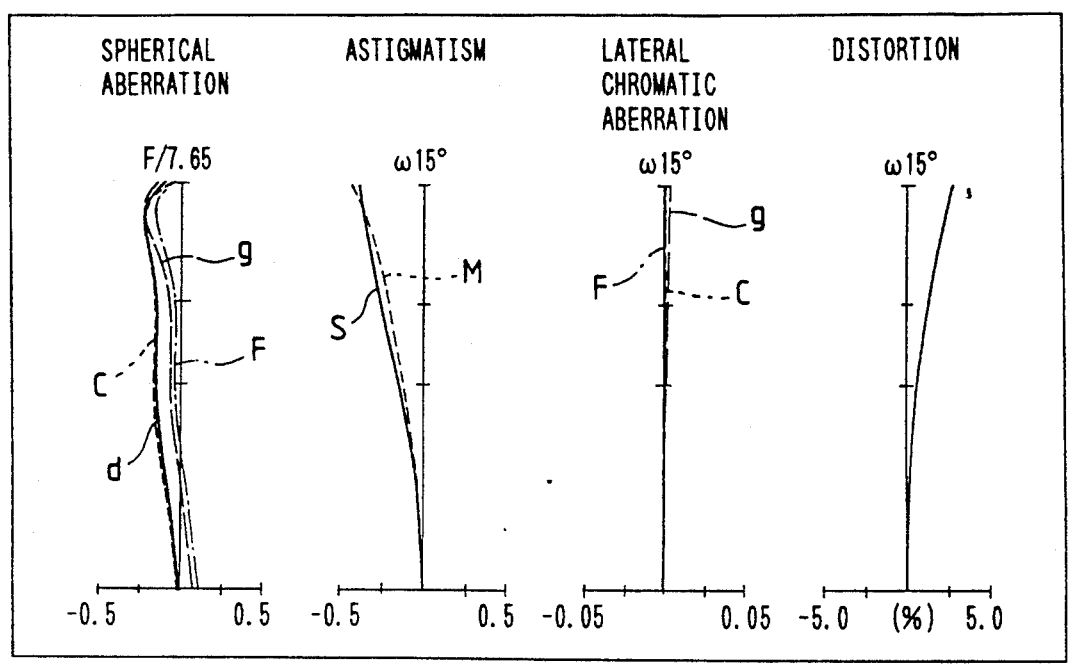

Aberration characteristics at the wide position, intermediate focal length and tele position of the Embodiment 1 are illustrated in FIG. 7, FIG. 8 and FIG. 9 respectively. Aberration characteristics at the wide position, intermediate focal length and tele position of the Embodiment 2 are visualized in FIG. 10, FIG. 11 and FIG. 12 respectively, whereas aberration characteristics at the wide position, intermediate focal length and tele position of the Embodiment 3 are illustrated in FIG. 13, FIG. 14 and FIG. 15 respectively.

The Embodiment 4 is designed as a zoom lens system having a field angle exceeding 90° at the wide position thereof. The Embodiment 4 effectively utilizes the airspace reserved in the first lens unit and comprises a surface which produces aberrations of high orders in each of lens units. Further, the negative lens component arranged in the fourth lens unit is divided into two lens elements for lessening the aberration correcting burden imposed on this lens unit.

Figure 16:
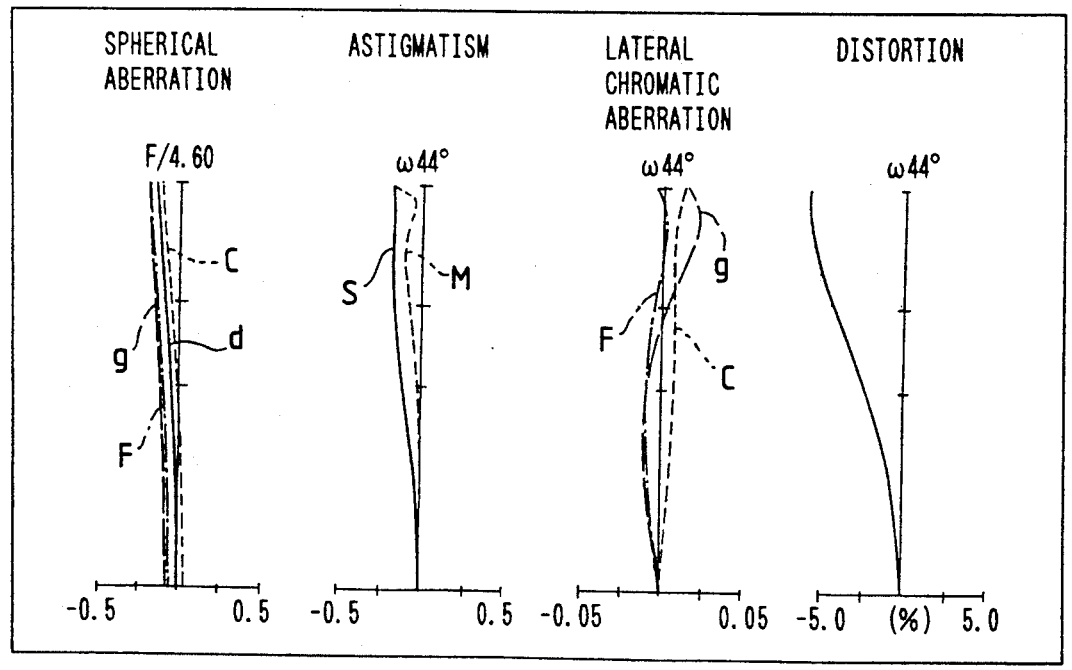
FIG. 16 through FIG. 18 show curves illustrating aberration characteristics of the Embodiment 4 of the present invention.
Figure 17:
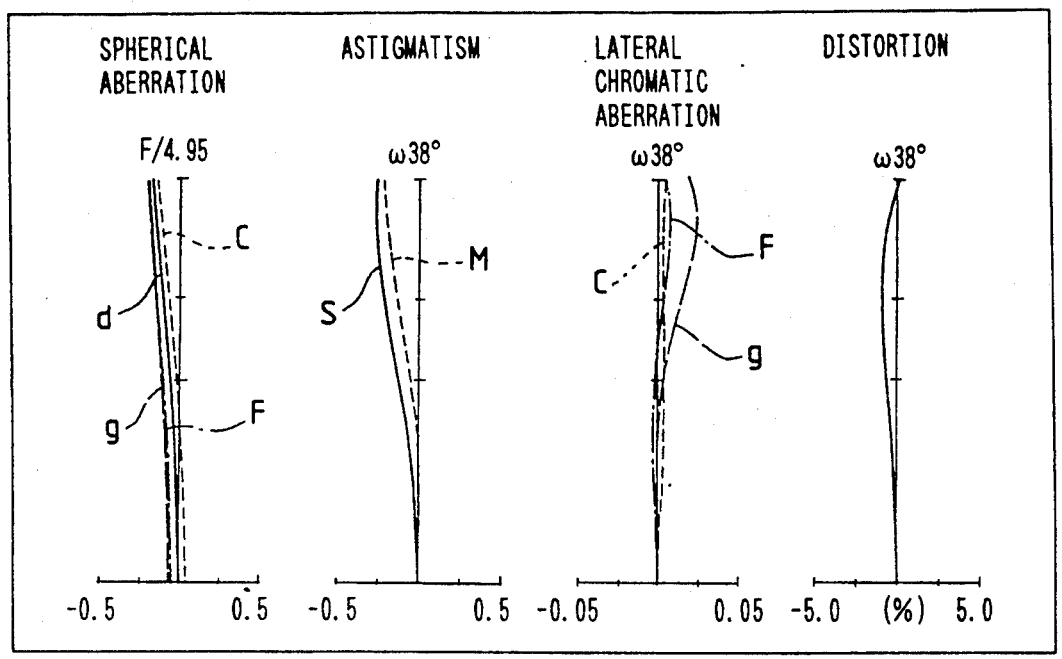
Figure 18:
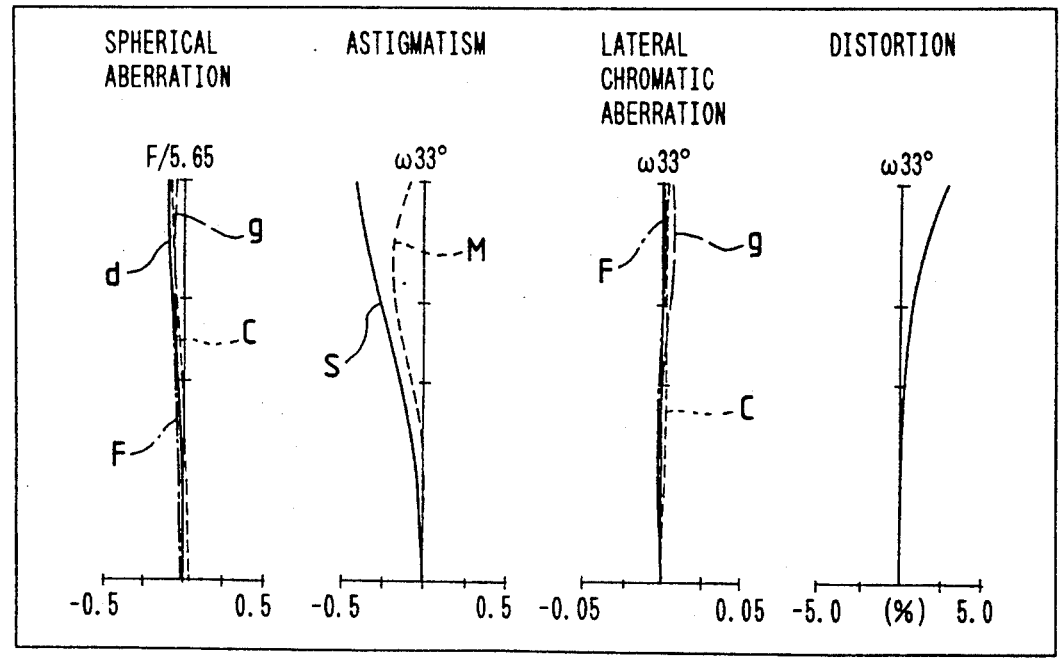

Aberration characteristics at the wide position, intermediate focal length and tele position of the Embodiment 4 are illustrated in FIG. 16, FIG. 17 and FIG. 18 respectively.

The Embodiments 5 and 6 have a field angle of 74° at the wide positions thereof and are designed as zoom lens systems having high vari-focal ratios in the true sense of the term. Especially, the Embodiment 6 has a focal length exceeding 100 mm at the tele position thereof. Since these embodiments have the high vari-focal ratios, the lens units are moved for long distances for zooming these lens systems. In each of the Embodiments 5 and 6, flare due to sagittal coma, distortion, etc. are corrected by the first lens unit and the fourth lens unit, whereas spherical aberration is corrected mainly by the second lens unit and the third lens unit.

Figure 19:
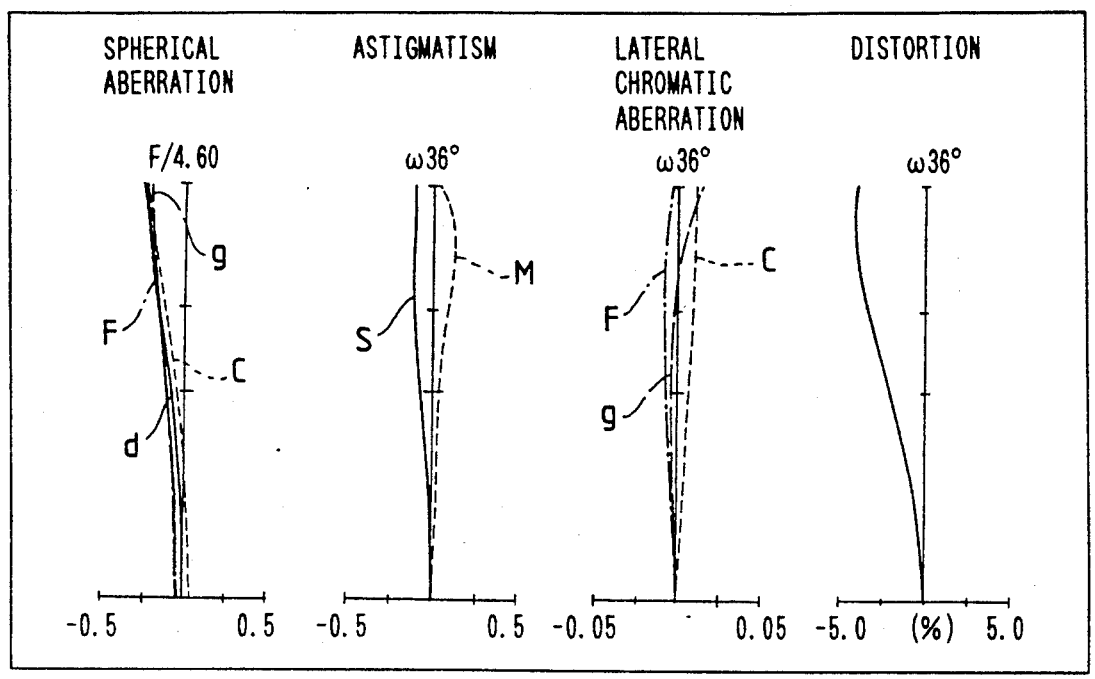
FIG. 19 through FIG. 21 show graphs illustrating aberration characteristics of the Embodiment 5 of the present invention.
Figure 20:
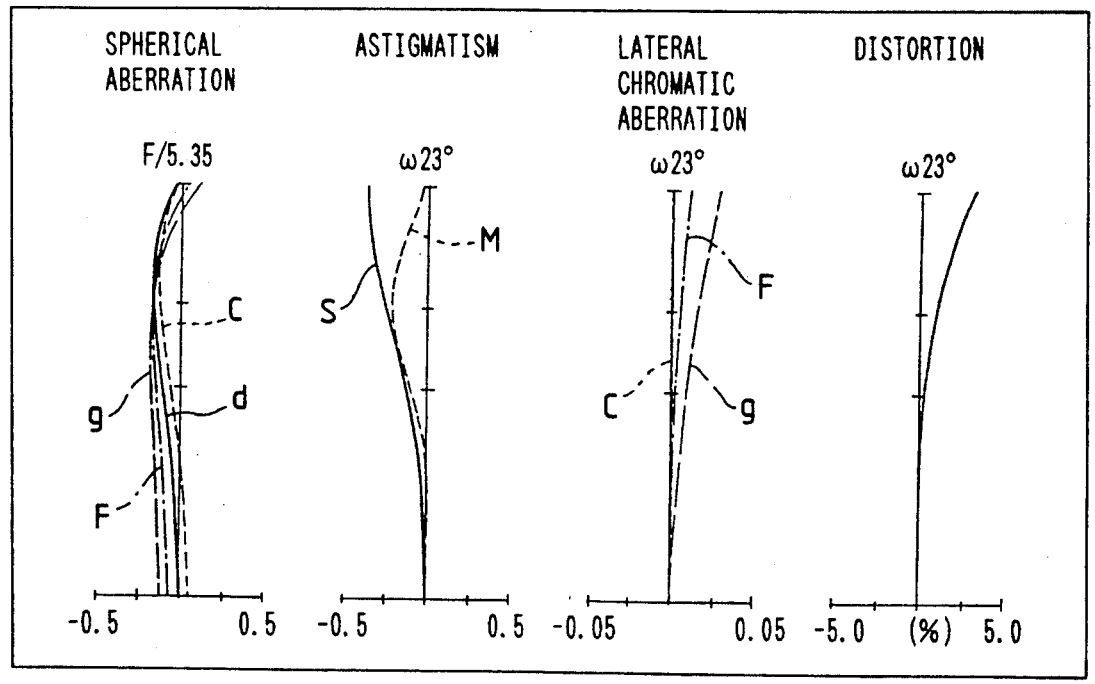
Figure 21:
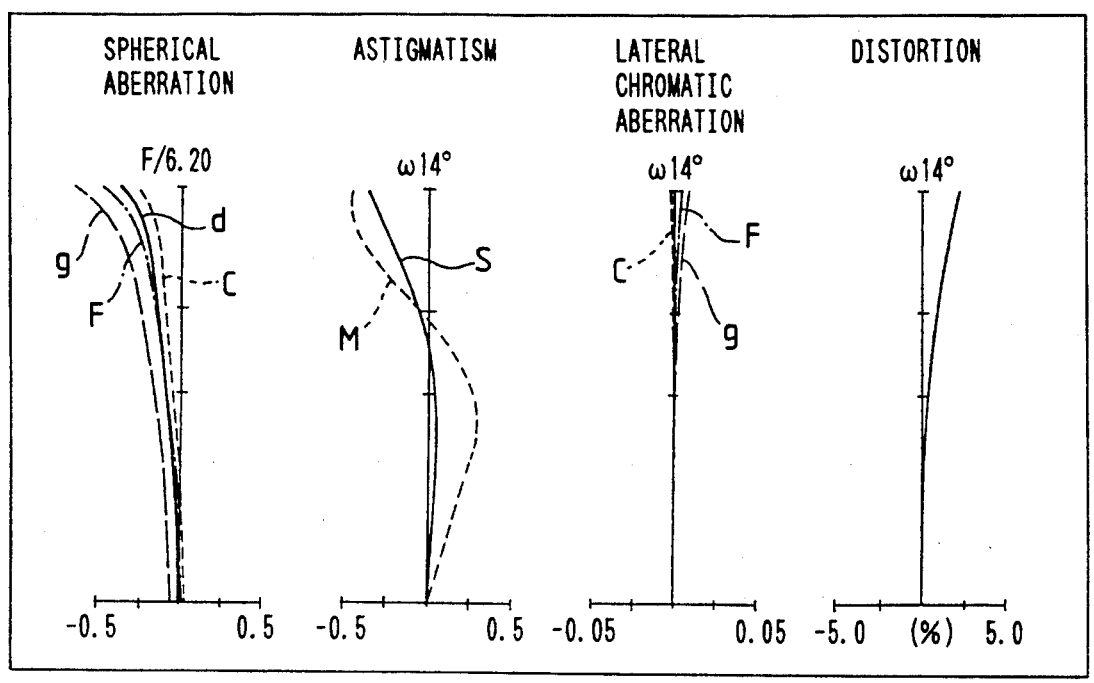
Figure 22:
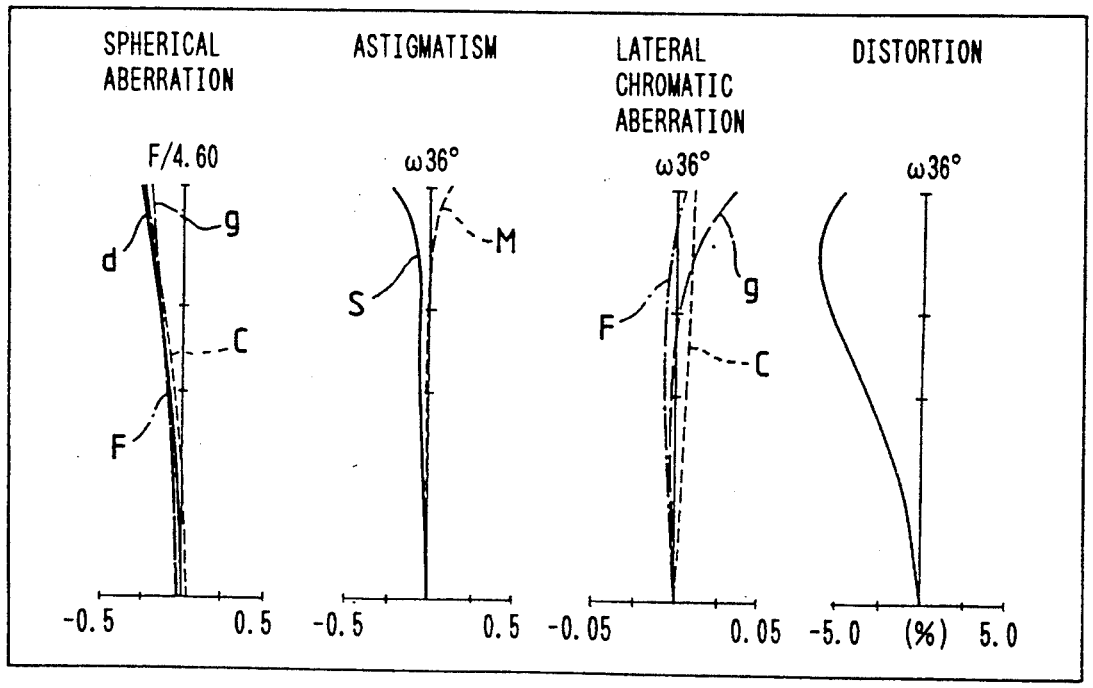
FIG. 22 through FIG. 24 show graphs illustrating aberration characteristics of the Embodiment 6 of the present invention.
Figure 23:
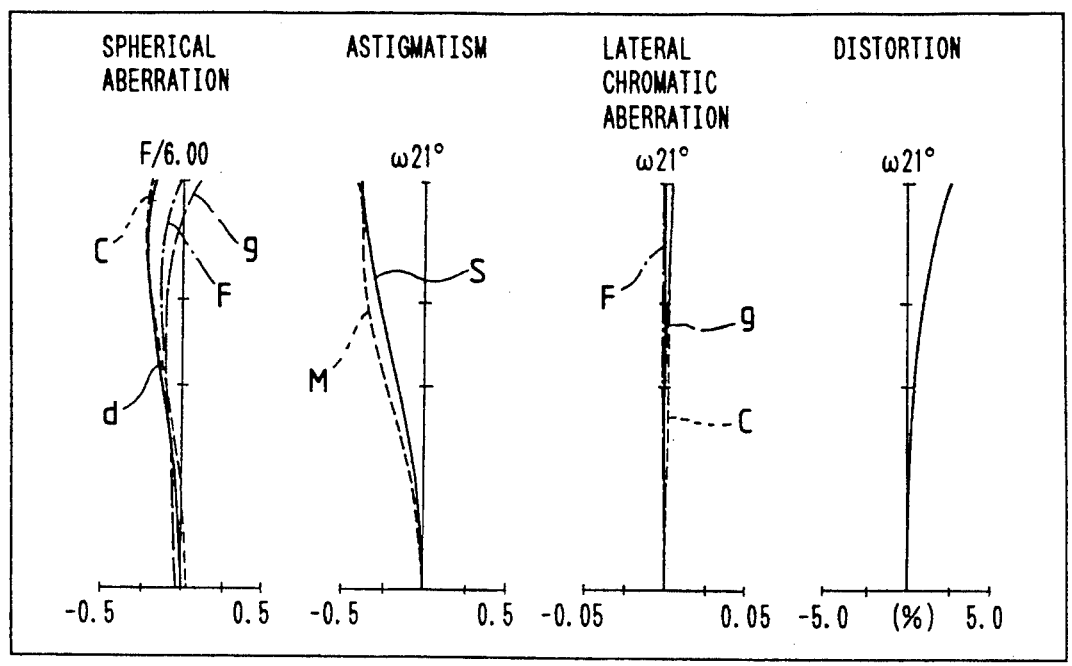
Figure 24:
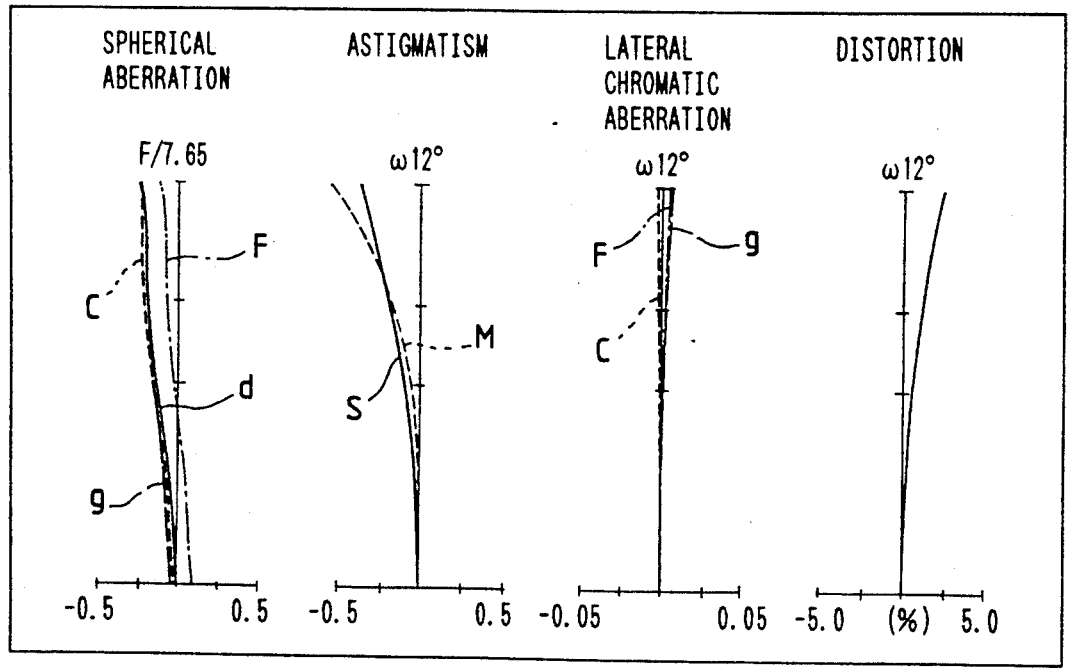
Figure 25:
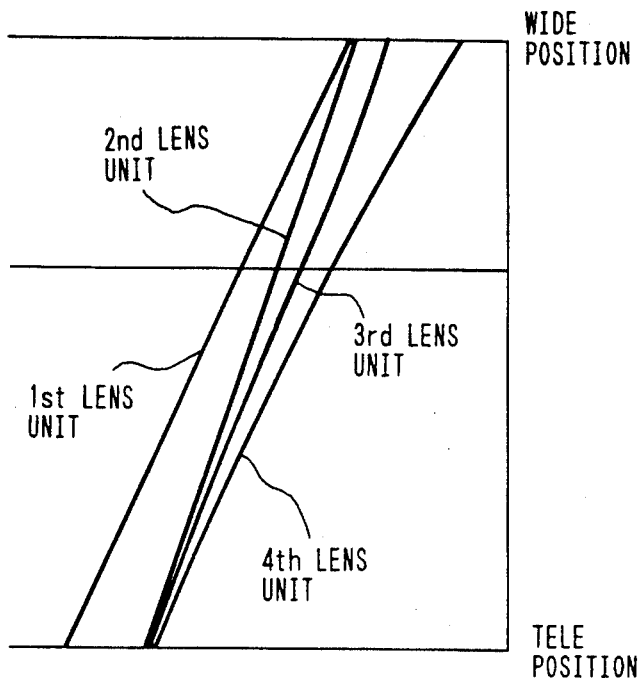
FIG. 25 shows a diagram illustrating moving loci for the lens units of the zoom lens system according to the present invention.
Figure 26:
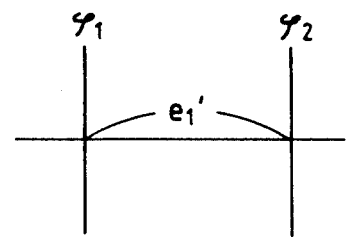
FIG. 26 shows a diagram illustrating a fundamental composition of the first lens unit and the second lens unit of the zoom lens system according to the present invention on an assumption that these lens units are thin.
Figure 27:
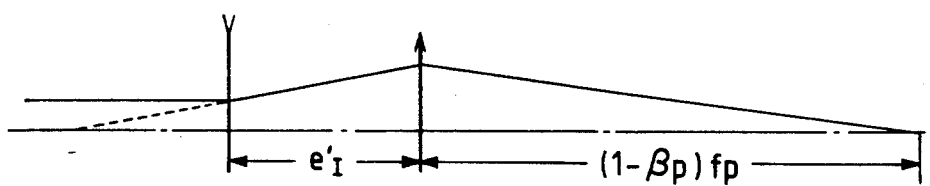
FIG. 27 shows a diagram illustrating the paraxial refractive power distribution for the first lens unit of the zoom lens system according to the present invention.

Aberration characteristics at the wide position, intermediate focal length and tele position of the Embodiment 5 are illustrated in FIG. 19, FIG. 20 and FIG. 21 respectively. Further, aberration characteristics at the wide position, intermediate focal length and tele position of the Embodiment 6 are visualized in FIG. 22, FIG. 23 and FIG. 24 respectively.

The zoom lens system according to the present invention adopts a refractive power distribution which is different from that for the generally known zoom lens system composed of four lens units, selects a unique refractive power distribution especially for the first lens unit and the second lens units, utilizes the airspace reserved in the first lens unit and further uses aspherical surfaces, thereby having a broad vari-focal ratio and a zooming range covering a super wide field angle, a compact design, and favorably corrected distortion, longitudinal chromatic aberration and other aberrations.

I claim:

1. A zoom lens system comprising, in order from the object side:
   a first lens unit having a positive refractive power;
   a second lens unit having a positive refractive power;
   a third lens unit having positive refractive power; and
   a fourth lens unit having a negative refractive power;
   wherein airspaces between lens unit are varied for zooming said zoom lens system; and
   wherein said second lens unit satisfies the following condition (1):

$$|\phi_2| < 0.01 \tag{1}$$

wherein the reference symbol $\phi_2$ represents the refractive power of said second lens unit.

2. A zoom lens system comprising, in order from the object side:
   a first lens unit having a positive refractive power;
   a second lens unit having a positive refractive power;
   a third lens unit having positive refractive power; and
   a fourth lens unit having a negative refractive power;
   wherein airspaces between lens unit are varied for zooming said zoom lens system; and
   wherein said second lens unit satisfies the following condition (1):

$$|\phi_2| < 0.01 \tag{1}$$

wherein the reference symbol $\phi_2$ represents the refractive power of said second lens unit.

3. A zoom lens system according to claims 1 or 2 wherein the first lens unit comprises a negative lens component and a positive lens component, the second lens unit comprises a negative lens component and a positive lens component, the third lens unit comprises two positive lens components and a negative lens component, and the fourth lens unit comprises a positive lens component and a negative lens component.

4. A zoom lens system according to claims 1 or 2 comprising at least an aspherical surface expressed by the following formula:

$$x = \frac{y^2/r}{1 + \sqrt{1 - (y/r)^2}} + \Sigma A_{2i} y^{2i}$$

wherein the direction along the optical axis is taken as the x axis, the direction perpendicular to the optical axis is taken as the y axis, the reference symbol r represents the radius of curvature of the aspherical surface as measured in the vicinity of the optical axis (the radius of curvature of the reference sphere of the aspherical surface) and the reference symbol $A_{2i}$ designates the aspherical surface coefficient where i is the index of summation.

5. A zoom lens system according to claims 1 or 2 satisfying the following condition:

$$f_1 < |f_{12}|$$

wherein the reference symbol $f_1$ represents the focal length of the first lens unit, and the reference symbol $f_{12}$ designates the total focal length of the first lens unit and the second lens unit.

6. A zoom lens system according to claim 5 wherein said first lens unit comprises a negative lens component arranged on the most object side therein and is designed so as to satisfy the following condition:

$$\theta_{1w}/\theta_{2w} > 1$$

wherein the reference symbol $\theta_{1w}$ represents the angle formed between the principal ray incident on said negative lens component and the optical axis at the wide position of the zoom lens system, and the reference symbol $\theta_{2w}$ designates the angle formed between the principal ray emerging from said negative lens component and the optical axis at the wide position.

* * * * *